United States Patent
Kato et al.

(10) Patent No.: US 9,706,087 B2
(45) Date of Patent: Jul. 11, 2017

(54) POLYMER ELEMENT, ELECTRONIC DEVICE, CAMERA MODULE, AND IMAGING APPARATUS

(71) Applicant: Dexerials Corporation, Tokyo (JP)

(72) Inventors: Yusaku Kato, Tokyo (JP); Kousuke Seki, Kanagawa (JP); Nobuyuki Nagai, Kanagawa (JP); Takehisa Ishida, Kanagawa (JP)

(73) Assignee: Dexerials Corporation, Tokyo (JP)

( * ) Notice: Subject to any disclaimer, the term of this patent is extended or adjusted under 35 U.S.C. 154(b) by 124 days.

(21) Appl. No.: 14/666,433

(22) Filed: Mar. 24, 2015

(65) Prior Publication Data

US 2015/0281531 A1  Oct. 1, 2015

(30) Foreign Application Priority Data

Mar. 31, 2014 (JP) ................. 2014-071353

(51) Int. Cl.
   *H04N 5/225*  (2006.01)
   *F03G 7/00*   (2006.01)

(52) U.S. Cl.
   CPC .......... *H04N 5/2252* (2013.01); *F03G 7/005* (2013.01); *H04N 5/2253* (2013.01); *H04N 5/2254* (2013.01); *H04N 5/2257* (2013.01)

(58) Field of Classification Search
   CPC ...... F03G 7/00; H04N 5/2252; H04N 5/2253; H04N 5/2257
   See application file for complete search history.

(56) References Cited

U.S. PATENT DOCUMENTS

| | | | | |
|---|---|---|---|---|
| 8,669,755 B2 * | 3/2014 | Kato | ...................... | G01B 7/287 204/406 |
| 8,715,531 B2 * | 5/2014 | Qian | ...................... | H01B 1/122 252/500 |
| 2007/0279497 A1 * | 12/2007 | Wada | ...................... | G03B 5/00 348/208.7 |
| 2010/0288635 A1 * | 11/2010 | Komiya | .................. | G01L 1/146 204/406 |
| 2013/0175899 A1 * | 7/2013 | Kato | ........................ | C09D 5/24 310/300 |
| 2014/0055670 A1 * | 2/2014 | Hongo | ................. | H04N 5/2253 348/374 |
| 2014/0250881 A1 * | 9/2014 | Yamamoto | ................ | F03G 7/00 60/527 |

FOREIGN PATENT DOCUMENTS

JP        2010-093954 A      4/2010

\* cited by examiner

*Primary Examiner* — Amy Hsu
(74) *Attorney, Agent, or Firm* — Wolf, Greenfield & Sacks, P.C.

(57) ABSTRACT

A polymer element includes a pair of electrode layers of which at least one includes a porous carbon material, and a polymer layer between the pair of electrode layers, in which the porous carbon material is provided with a first hole in a surface and a second hole which is smaller than the first hole and which communicates with the first hole.

16 Claims, 20 Drawing Sheets

NUMBER OF OPERATIONS

POLYMER ELEMENT, ELECTRONIC DEVICE, CAMERA MODULE, AND IMAGING APPARATUS

CROSS REFERENCE TO RELATED APPLICATIONS

This application claims the benefit of Japanese Priority Patent Application JP 2014-071353 filed Mar. 31, 2014, the entire contents of which are incorporated herein by reference.

BACKGROUND

The present disclosure relates to a polymer element such as a polymer actuator element or a polymer sensor element, and an electronic device, a camera module, and an imaging apparatus which use the polymer element.

In recent years, for example, remarkable progress was made in terms of increasing the functionality of portable electronic devices such as mobile phones, personal computers (PC), or personal digital assistants (PDA) and portable electronic devices which are provided with an imaging function by being mounted with a camera module are common. In such portable electronic devices, focusing or zooming is performed by moving a lens inside the camera module in the optical axis direction of the lens.

In the related art, methods for moving a lens inside a camera module using a voice coil motor, a stepping motor, or the like as a driving section are common. On the other hand, recently, from the point of view of miniaturization, portable electronic devices which use a predetermined actuator element as a driving section have been developed. Examples of such actuator elements include a polymer actuator element. The polymer actuator element interposes an ion conductive polymer layer (simply referred to below as a polymer layer), for example, between a pair of electrode layers. For example, the polymer layer includes water, an ionic liquid, or a high boiling point organic solvent. In such a polymer actuator element, by applying an electric field between the pair of electrode layers, ions move in the polymer layer and displacement is generated. For this reason, the operating characteristics of the polymer actuator element such as displacement amount, response speed, and the like greatly depend on the conduction environment of the ions. Thus, apart from being used as a polymer actuator element, the polymer element may also be used as a polymer sensor element, an electric double layer capacitor, a secondary battery, or the like.

For example, a porous carbon material may be used for the electrode layer of a polymer element (for example, Japanese Unexamined Patent Application Publication No. 2010-93954 and the like). A method which, for example, focuses on a specific surface area of the porous carbon material in such a polymer element and improves the characteristics thereof has been examined.

SUMMARY

However, even when the specific surface area of the porous carbon material is increased, the characteristics of the polymer element are not sufficiently improved.

It is desirable to provide a polymer element which has high-level characteristics and an electronic device, a camera module, and an imaging apparatus which use the polymer element.

According to an embodiment of the present disclosure, there is provided a first polymer element including a pair of electrode layers of which at least one includes a porous carbon material, and a polymer layer between the pair of electrode layers, in which the porous carbon material is provided with a first hole in a surface and a second hole which is smaller than the first hole and which communicates with the first hole.

According to another embodiment of the present disclosure, there is provided a first electronic device including a polymer element which has a pair of electrode layers of which at least one includes a porous carbon material, and a polymer layer between the pair of electrode layers, in which the porous carbon material is provided with a first hole in a surface and a second hole which is smaller than the first hole and which communicates with the first hole.

According to still another embodiment of the present disclosure, there is provided a first camera module including a lens, and a driving apparatus which is configured using a polymer element and which drives the lens, in which the polymer element has a pair of electrode layers of which at least one includes a porous carbon material, and a polymer layer between the pair of electrode layers, and the porous carbon material is provided with a first hole in a surface and a second hole which is smaller than the first hole and which communicates with the first hole.

According to still another embodiment of the present disclosure, there is provided a first imaging apparatus including a lens, an imaging element which acquires an imaging signal imaged by the lens, and a driving apparatus which is configured using a polymer element and which drives the lens or the imaging element, in which the polymer element has a pair of electrode layers of which at least one includes a porous carbon material, and a polymer layer between the pair of electrode layers, and the porous carbon material is provided with a first hole in a surface and a second hole which is smaller than the first hole and which communicates with the first hole.

In the first polymer element, the first electronic device, the first camera module, or the first imaging apparatus of the present disclosure, since the first hole, which is larger out of the first hole and the second hole of the porous carbon material, is provided in the surface, ions easily enter the first hole. The ions pass through the first hole and are adsorbed to the second hole.

According to still another embodiment of the present disclosure, there is provided a second polymer element including a pair of electrode layers, and a polymer layer between the pair of electrode layers, in which at least one of the pair of electrode layers includes a porous carbon material, and a metal oxide.

According to still another embodiment of the present disclosure, there is provided a second electronic device including a polymer element which has a pair of electrode layers, and a polymer layer between the pair of electrode layers, in which at least one of the pair of electrode layers includes a porous carbon material, and a metal oxide.

According to still another embodiment of the present disclosure, there is provided a second camera module including a lens, and a driving apparatus which is configured using a polymer element and which drives the lens, in which the polymer element has a pair of electrode layers and a polymer layer between the pair of electrode layers, and at least one of the pair of electrode layers includes a porous carbon material, and a metal oxide.

According to still another embodiment of the present disclosure, there is provided a second imaging apparatus including a lens, an imaging element which acquires an imaging signal imaged by the lens, and a driving apparatus which is configured using a polymer element and which drives the lens or the imaging element, in which the polymer element has a pair of electrode layers, and a polymer layer between the pair of electrode layers, and at least one of the pair of electrode layers includes a porous carbon material, and a metal oxide.

In the second polymer element, the second electronic device, the second camera module, or the second imaging apparatus of the present disclosure, since a metal oxide is included in the electrode layer, ions are generated due to an oxidation-reduction reaction of the metal oxide.

Since the larger first hole is provided in the surface of the porous carbon material according to the first polymer element, the first electronic device, the first camera module, or the first imaging apparatus of the present disclosure and since the electrode layer includes the metal oxide according to the second polymer element, the second electronic device, the second camera module, or the second imaging apparatus of the present disclosure, it is possible to improve the characteristics thereof. Note that the effects described here are not necessarily limited and may be any of the effects described in the present disclosure.

BRIEF DESCRIPTION OF THE DRAWINGS

FIG. 13 is a cross-sectional diagram which represents a state of an electrode layer interface of the polymer element shown in FIG. 9 and the like;

DETAILED DESCRIPTION OF EMBODIMENTS

Detailed description will be given below of embodiments of the present disclosure with reference to the diagrams. Here, description will be given in the following order.

1. First Embodiment (Polymer element: Example in which an electrode layer includes a hierarchical type porous carbon material)

2. Modified Example (Example which has a low resistance layer in contact with an electrode layer)

3. Second Embodiment (Polymer Element: Example in which the electrode layer includes a metal oxide in addition to the hierarchical type porous carbon material)

4. Third Embodiment (Polymer Element: Example in which the electrode layer includes a porous carbon material and a metal oxide)

5. Application Examples

Application Example 1 (Application example for an imaging apparatus which is provided with a driving apparatus which drives a lens)

Application Example 2 (Application example for an imaging apparatus which is provided with a driving apparatus which drives an imaging element)

Other Application Examples

EMBODIMENTS

Configuration of Polymer Element 10

Figure 1:
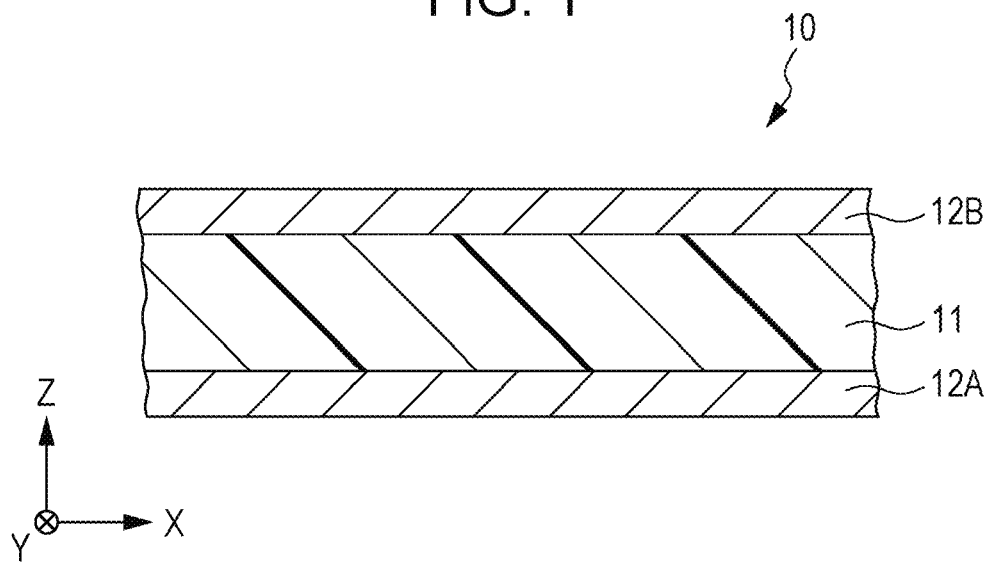
FIG. 1 is a cross-sectional diagram which represents a configuration of a polymer element according to a first embodiment of the present disclosure.

FIG. 1 represents a cross-sectional configuration example (a Z-X cross-sectional configuration example) of a polymer element (a polymer element 10) according to an embodiment of the present disclosure. The polymer element 10 has a polymer layer 11 between a pair of electrode layers 12A and 12B and is applied to, for example, a polymer actuator element, a polymer sensor element, or the like. The periphery of the polymer element 10 may be covered by an insulating protective film. It is possible to configure the insulating protective film by, for example, a material which has high elasticity (for example, polyurethane and the like).

Polymer Layer 11

The polymer layer 11 is configured by, for example, an ion conductive polymer compound film impregnated with an ionic substance. The "ionic substance" referred to here indicates typical ions which are able to be conducted inside the polymer layer 11. In detail, the "ionic substance" has the meaning of a substance which includes hydrogen ions or simple metal ions or cations and/or anions thereof, and a polar solvent, or a substance which itself is in liquid form such as imidazolium salt and which includes cations and/or anions. Examples of the former include substances in which a polar solvent is solvated in cations and/or anions and examples of the latter include an ionic liquid.

The ionic substance may be an organic substance or an inorganic substance and the type thereof is not limited. Cations may be included or anions may be included in the ionic substance; however, description will be given here of a case where cations are included in the ionic substance. Examples of the ionic substance which includes cations include various types of forms such as simple metal ions, a substance which includes metal ions and water, a substance which includes organic cations and water, or an ionic liquid. In detail, examples of the metal ions include light metal ions such as sodium ions ($Na^+$), potassium ions ($K^+$), lithium ions ($Li^+$), or magnesium ions ($Mg^{2+}$). Examples of organic cations include alkyl ammonium ions and the like. Ions which are included in the ionic substance are present in the polymer layer 11 as a hydrate. For this reason, in the polymer element 10, it is preferable that the entire polymer element 10 is sealed in order to prevent the evaporation of water.

An ionic liquid includes cations and anions. The ionic liquid is a so-called ambient temperature molten salt and has a flame retardant property and low volatility. In detail, examples of the ionic liquid include imidazolium ring compounds, pyridinium ring compounds, aliphatic compounds, and the like. It is preferable to use the ionic liquid as the ionic substance. By using the polymer layer 11 which includes the ionic liquid with low volatility, the polymer element 10 favorably operates even in a high temperature atmosphere or in a vacuum.

When a cationic substance is impregnated as an ionic substance, it is possible to use, for example, a cation exchange resin film, which has a fluororesin, a hydrocarbon base, or the like as a skeleton, as the ion conductive polymer compound film. Examples of the cation exchange resin film include a film to which an acidic functional group such as a sulfone (sulfo) group or a carboxyl group is introduced. Specific examples are polyethylene which has an acidic functional group, polystyrene which has an acidic functional group, a fluororesin film which has an acidic functional group, and the like. From among the above, a fluororesin film which has a sulfone group or a carboxyl group is preferable as the cation exchange resin film and examples thereof include Nafion (manufactured by Du Pont Kabushiki Kaisha).

Electrode Layers 12A and 12B

Each of the electrode layers 12A and 12B includes a porous carbon material (a porous carbon material 121 in FIG. 2 which will be described below) in a polymer material. It is preferable that the porous carbon material 121 is included in both the electrode layers 12A and 12B; however, it is sufficient if the porous carbon material 121 is included in at least one of the electrode layers 12A and 12B. One of the electrode layers 12A and 12B may include the porous carbon material 121 and the other may include another conductive material.

It is possible to use an ion conductive polymer material for the polymer material and specifically, it is possible to use the same material as the constituent material of the polymer layer 11. Ions are conducted inside the electrode layers 12A and 12B by the ion conductive polymer material.

Figure 2:
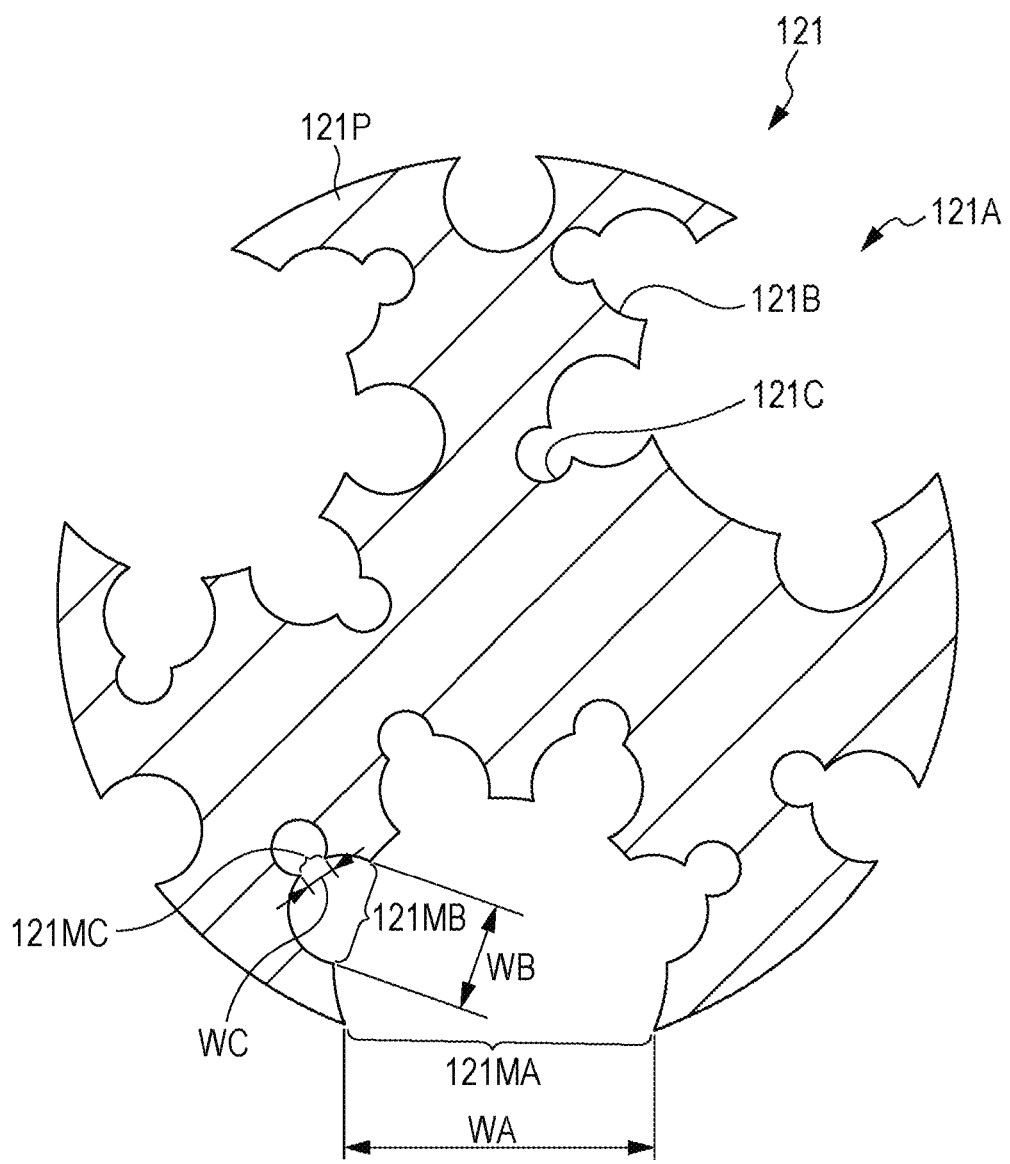
FIG. 2 is a cross-sectional schematic diagram which represents a configuration of a porous carbon material which is included in electrode layers in FIG. 1.

FIG. 2 schematically represents a structure of a cross-section of the porous carbon material 121. The porous carbon material 121 is, for example, a collection of a plurality of particles 121P and a plurality of holes (macropores 121A, mesopores 121B, and micropores 121C which will be described below) are provided in the surfaces of and inside each of the particles 121P. The porous carbon material 121 has a so-called hierarchical type porous structure. In detail, the macropores 121A (the first holes) are provided in the surface of the particle 121P, the mesopores 121B (the second holes) are provided to communicate with the macropores 121A, and the micropores 121C (the third holes) are provided to communicate with the mesopores 121B. That is, the macropores 121A, the mesopores 121B, and the micropores 121C which communicate with each other are provided in this order from the surface of the particle 121P toward the inner section. Details will be described below; however, due to this, the ions (ions 11I in FIG. 6 which will be described below) easily enter the macropores 121A and the number of ions which are adsorbed to the micropores 121C from the macropores 121A via the mesopores 121B increases.

The macropores 121A, the mesopores 121B, and the micropores 121C are, for example, substantially spherical holes and the sizes thereof are smaller in order of the macropores 121A, the mesopores 121B, and the micropores 121C. For example, the diameter of the macropores 121A is larger than 50 nm, the diameter of the mesopores 121B is 2 nm to 50 nm, and the diameter of the micropores 121C is smaller than 2 nm. That is, the sizes of the holes are larger in the order of the micropores 121C, the mesopores 121B, and the macropores 121A. The macropores 121A and the mesopores 121B are in contact and the mesopores 121B and the micropores 121C are in contact.

Openings 121MA to the macropores 121A are provided in the surface of the particle 121P. Openings 121MB to the mesopores 121B are provided in the macropores 121A. Openings 121MC to the micropores 121C are provided in the mesopores 121B. Ions pass through the openings 121MA, the openings 121MB, and the openings 121MC in this order and are adsorbed to the micropores 121C. The ions may be adsorbed to the mesopores 121B. It is preferable that the openings 121MA (the area of the openings 121MA) are the largest and that the openings 121MB and the openings 121MC are smaller in this order. For example, it is preferable that a width WC of the openings 121MC, a width WB of the openings 121MB, and a width WA of the openings 121MA are larger in this order. For example, the maximum value of the width WA of the openings 121MA is the diameter of the macropores 121A, the maximum value of the width WB of the openings 121MB is the diameter of the mesopores 121B, and the maximum value of the width WC of the openings 121MC is the diameter of the micropores 121C.

Figure 3:
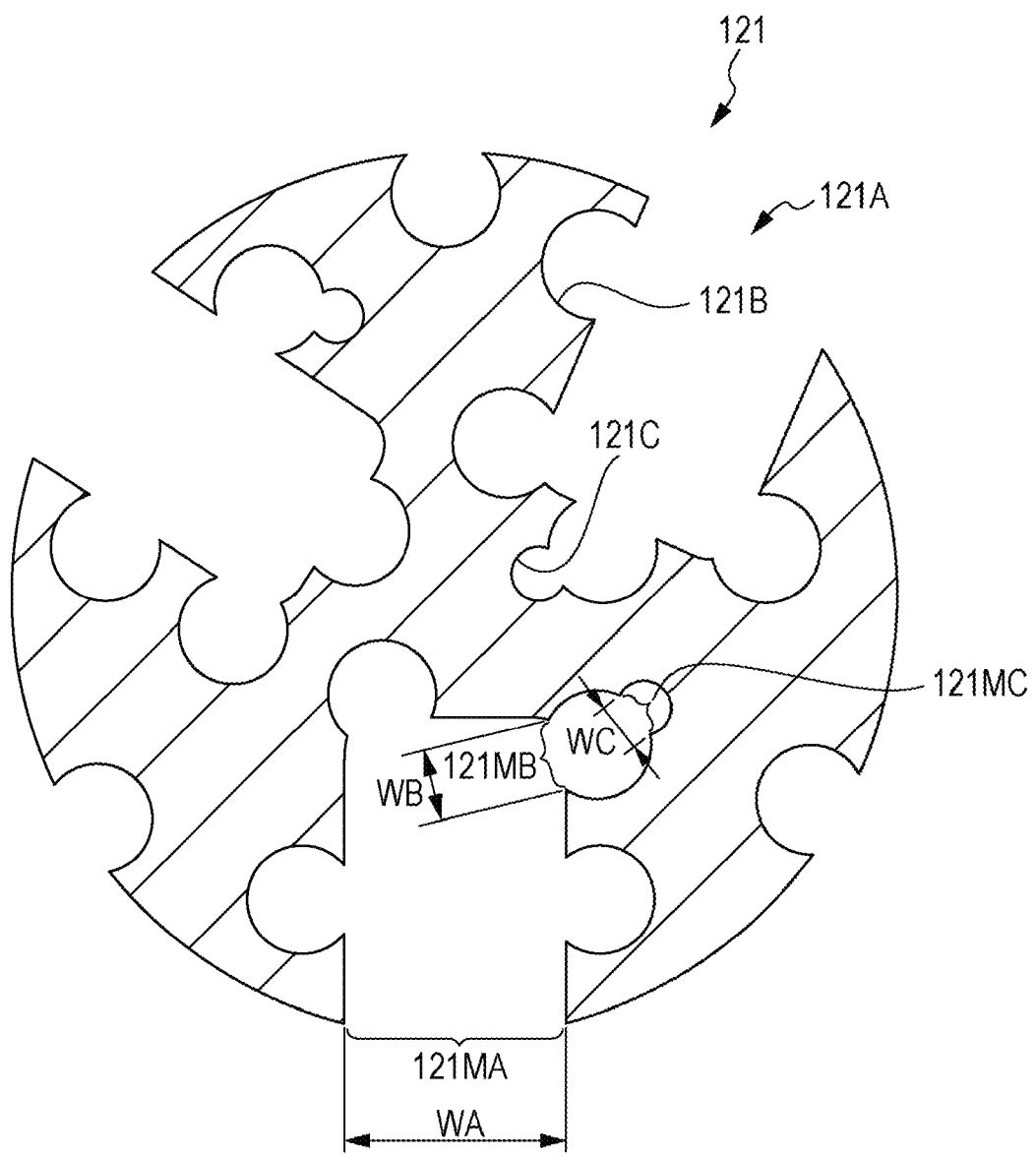
FIG. 3 is a cross-sectional schematic diagram which represents another example of a configuration of the porous carbon material shown in FIG. 2.

The shape of the macropores 121A, the mesopores 121B, and the micropores 121C may be any shape and one of the holes out of the macropores 121A, the mesopores 121B, and the micropores 121C (for example, the macropores 121A) may have a different shape from the other holes (for example, the mesopores 121B and the micropores 121C) (FIG. 3).

Two holes may be provided from the surface of the particle 121P to the inner section. For example, the macropores 121A may be provided in the surface of the particle 121P and the micropores 121C may be provided to communicate with the macropores 121A. For example, the mesopores 121B may be provided in the surface of the particle 121P and the micropores 121C may be provided to communicate with the mesopores 121B. For example, the macropores 121A may be provided in the surface of the particle 121P and the mesopores 121B may be provided to communicate with the macropores. In addition to such hierarchical type holes, simple holes and the like may be present.

The electrode layers 12A and 12B may include a substance with a higher electrical conductivity than that of the porous carbon material in addition to the porous carbon material described above as a conductive substance. Examples of such a conductive substance include metal particles, conductive carbon particles, carbon fibers, conductive polymers, metal oxides, and the like. Examples of the metal particles include gold (Au), silver (Ag), platinum (Pt), aluminum (Al), nickel (Ni), and the like. These metals may be formed in a wire form or a nanowire form to be included in the electrode layers 12A and 12B. Examples of the conductive carbon particles include carbon nanotubes, carbon nanowires, carbon fibers, graphene, Ketjenblack (a registered trademark), carbon black, and the like. Examples of the conductive polymer include polyaniline, polyacetylene, polythiophene, polypyrrole, and the like. Examples of the metal oxide include an indium oxide-based compound, a zinc oxide-based compound, and the like. The indium oxide-based compound is, for example, an indium tin oxide (ITO) or the like and the zinc oxide-based compound is, for example, indium zinc oxide (IZO), aluminum-doped zinc oxide (AZO), gallium-doped zinc oxide (GZO), or the like. By the electrode layers 12A and 12B including a conductive substance with low resistance, it is possible to suppress the electrical resistance of the electrode layers 12A and 12B from increasing.

Method for Manufacturing Polymer Element 10

It is possible to manufacture the polymer element 10 of the present embodiment, for example, as follows.

Firstly, a coating material is prepared by mixing the constituent materials of the electrode layers 12A and 12B. In detail, for example, a perfluorosulfonic acid polymer such as Nafion is prepared as the polymer material. The porous carbon material 121 is added thereto and mixed in pure water. It is possible to use, for example, bio-carbon or artificial porous carbon for the porous carbon material 121 which has a hierarchical type porous structure. The bio-carbon is a carbon material derived from plants and is able to be obtained, for example, from chaff such as rice (rice plant), barley, wheat, rye, Japanese millet, or millet, or straw. Alternatively, the bio-carbon may be produced from reed, stem seaweed, and the like. It is possible to use vascular plants, pteridophytes, bryophytes, algae, seaweeds, and the like which grow on land as a raw material of the bio-carbon. For example, the macropores 121A are formed by the intercellular layers of a plant and the mesopores 121B and the micropores 121C are formed by the cellular wall surfaces. Methods for producing bio-carbon which has a hierarchical type porous structure are described in Japanese Unexamined Patent Application Publication No. 2008-273816 and Japanese Unexamined Patent Application Publication No. 2010-104979. Since complicated steps are not necessary for generating bio-carbon, it is preferable to use bio-carbon for the porous carbon material 121. In the artificial porous carbon, a regular hierarchical type porous structure is formed using a mold. For example, an inorganic material such as zeolite, silica, or silicon carbide is used for the mold. It is also possible to form the porous carbon material 121 which has a hierarchical type porous structure using an organic precursor. The porous carbon material 121 may be formed by combining a mold of an inorganic material and an organic precursor. With such an artificial porous carbon, it is possible to control the size, shape, and the like of the holes. For this reason, it is possible to improve the characteristics by adjusting the design of the hole according to the types of driving ions.

In this manner, a coating material which is prepared by mixing the constituent materials of the electrode layers 12A and 12B is coated on both surfaces of the polymer layer 11 and dried. Due to this, the polymer element 10 is completed. The constituent materials of the electrode layers 12A and 12B may be formed into a film after being mixed, and the polymer element 10 may be formed by crimping this film on both surfaces of the polymer layer 11. For example, Nafion is used for the polymer layer 11.

Operation and Effects of Polymer Element 10

A. Basic Operation when Functioning as a Polymer Actuator Element

In the polymer element 10 of the present embodiment, when a predetermined potential difference is generated between the electrode layers 12A and 12B, deformation (curving) is generated in the polymer layer 11 under the following principle. In other words, in this case, the polymer element 10 functions as a polymer actuator element. Description will be given below of an operation of the polymer element 10 as a polymer actuator element.

Figure 4A:
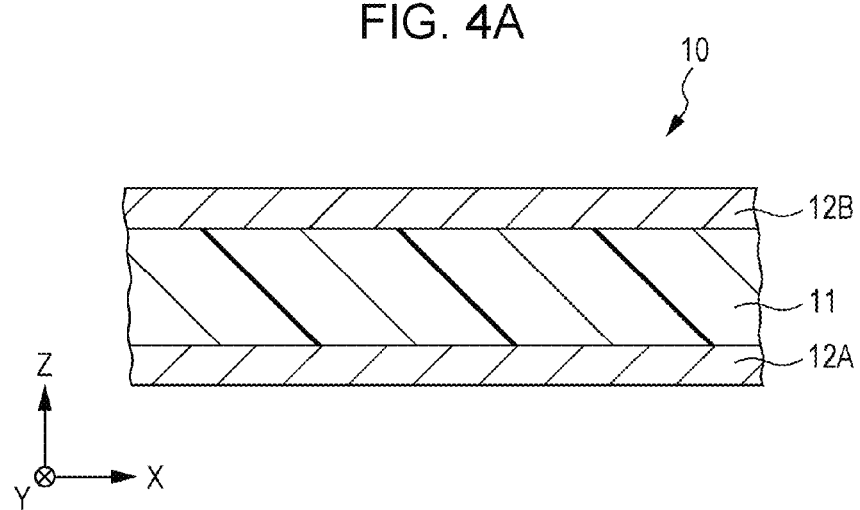
FIG. 4A is a cross-sectional diagram which represents the polymer element shown in FIG. 1 when a voltage is not applied.
Figure 4B:
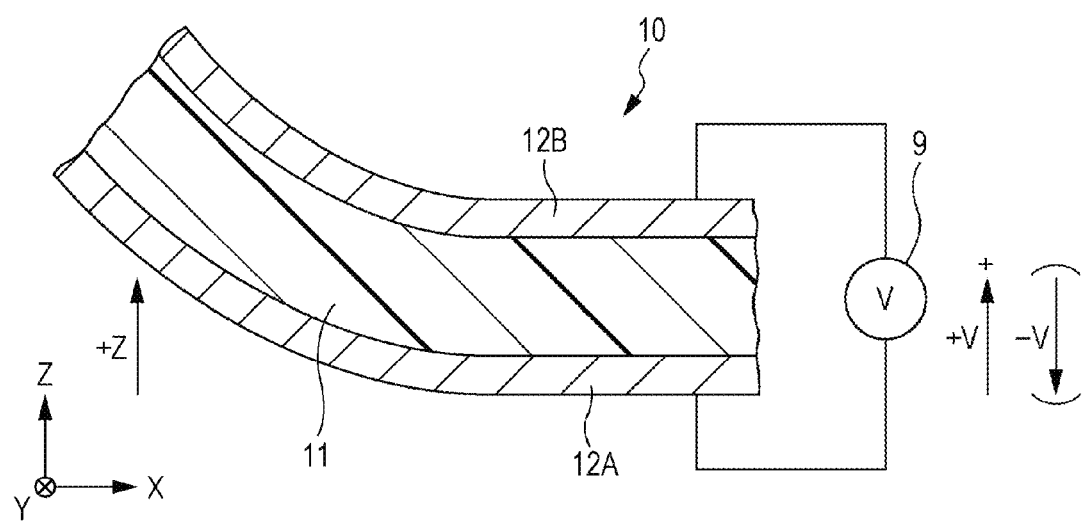
FIG. 4B is a cross-sectional schematic diagram which represents an operation of the polymer element shown in FIG. 1 when a voltage is applied.

FIG. 4A and FIG. 4B schematically represent the operation of the polymer element 10 (the operation as a polymer actuator element) using a cross-sectional diagram (a Z-X cross-sectional diagram). Description will be given below of the operation of the polymer element 10 for different cases according to the type of ionic substance which is impregnated in the polymer layer 11.

Firstly, description will be given of a case of using a substance which includes cations and a polar solvent as the ionic substance.

In this case, the polymer element 10 in a state where a voltage is not applied has a planar form without being curved since a cationic substance is substantially uniformly dispersed in the polymer layer 11 (FIG. 4A). Here, when a voltage function section 9 shown in FIG. 4B (in this case, a voltage supplying section) sets a voltage application state (the application of a driving voltage Vd is started), the polymer element 10 exhibits the following behavior. For example, when a predetermined driving voltage Vd is applied between the electrode layers 12A and 12B such that the electrode layer 12A is a negative potential and the electrode layer 12B is a positive potential (refer to the arrow "+V" in FIG. 4B), cations move to the electrode layer 12A side in a state of being solvated with a polar solvent. At this time, since anions hardly move in the polymer layer 11, the electrode layer 12A side is extended and the electrode layer 12B side shrinks in the polymer layer 11. Due to this, the polymer element 10 is curved to the electrode layer 12B side as a whole as shown with the arrow "+Z" in FIG. 4B.

After that, when a state where a voltage is not applied is set by eliminating the potential difference between the electrode layers 12A and 12B (the application of the driving voltage Vd is stopped), the cationic substance (the cations and the polar solvent) which is biased to the electrode layer 12A side in the polymer layer 11 is diffused and returns to the state shown in FIG. 4A.

In addition, when a predetermined driving voltage Vd is applied between the electrode layers 12A and 12B such that the electrode layer 12A is a positive potential and the electrode layer 12B is a negative potential from the state where a voltage is not applied shown in FIG. 4A, the cations move to the electrode layer 12B side in a state of being solvated with a polar solvent. In this case, the electrode layer 12A side shrinks and the electrode layer 12B side is extended in the polymer layer 11. Due to this, the polymer element 10 is curved to the electrode layer 12A side as a whole (which is not shown in the diagram).

Also in this case, when a state where a voltage is not applied is set by eliminating the potential difference between the electrode layers 12A and 12B, the cationic substance which is biased to the electrode layer 12B side in the polymer layer 11 is diffused and returns to the state shown in FIG. 4A.

Next, description will be given of a case of using an ionic liquid which includes cations in a liquid form as an ionic substance.

In this case, since the ionic liquid is substantially uniformly dispersed in the polymer layer 11 in a state where a voltage is not applied, the polymer element 10 has the planar form shown in FIG. 4A. Here, when a state where a voltage is applied by a voltage function section 9 is set (the application of the driving voltage Vd is started), the polymer element 10 exhibits the following behavior. For example, when a predetermined driving voltage Vd is applied between the electrode layers 12A and 12B such that the electrode layer 12A is a negative potential and the electrode layer 12B is a positive potential (refer to the arrow "+V" in FIG. 4B), cations in the ionic liquid move to the electrode layer 12A side. On the other hand, the anions in the ionic liquid do not move in the polymer layer 11 which is a cation-exchange film. For this reason, the electrode layer 12A side is extended and the electrode layer 12B side is compressed in the polymer layer 11. Due to this, the polymer element 10 is curved to the electrode layer 12B side as a whole as shown with the arrow "+Z" in FIG. 4B.

After that, when a state where a voltage is not applied is set by eliminating the potential difference between the electrode layers 12A and 12B (the application of the driving voltage Vd is stopped), the cations which are biased to the electrode layer 12A side in the polymer layer 11 are diffused and return to the state shown in FIG. 4A.

In addition, when a predetermined driving voltage Vd is applied between the electrode layers 12A and 12B such that the electrode layer 12A is a positive potential and the electrode layer 12B is a negative potential from the state where a voltage is not applied shown in FIG. 4A, the cations in the ionic liquid move to the electrode layer 12B side. In this case, the electrode layer 12A side is compressed and the electrode layer 12B side is extended in the polymer layer 11. Due to this, the polymer element 10 is curved to the electrode layer 12A side as a whole (which is not shown in the diagram).

Also in this case, when a state where a voltage is not applied is set by eliminating the potential difference between the electrode layers 12A and 12B, the cations which are biased to the electrode layer 12B side in the polymer layer 11 are diffused and return to the state shown in FIG. 4A.

B. Basic Operation when Functioning as a Polymer Sensor Element

In addition, in the polymer element 10 of the present embodiment, in contrast, when the polymer layer 11 is deformed (curved) in a direction which is orthogonal with a surface direction (here, a Z axis direction), a voltage (electromotive force) is generated between the electrode layer 12A and the electrode layer 12B under the following principle. In other words, in this case, the polymer element 10 functions as a polymer sensor element (for example, a bending sensor, a speed sensor, an acceleration sensor, or the like). Description will be given below of the operation of the polymer element 10 for different cases according to the type of the ionic substance which is impregnated in the polymer layer 11.

Firstly, description will be given of a case of using a substance which includes cations and a polar solvent as an ionic substance.

In this case, in a state where the polymer element 10 itself does not receive a bending stress, for example, due to external force, or when the polymer element 10 is not in linear motion or rotational motion and acceleration and angular acceleration are not generated, force which is caused thereby is not applied to the polymer element 10. Accordingly, the polymer element 10 has a planar form without being deformed (curved) (FIG. 4A). Therefore, since the cationic substance is substantially uniformly dispersed in the polymer layer 11, a potential difference is not generated between the electrode layers 12A and 12B and the detected voltage in the polymer element 10 is 0 (zero) V.

On the other hand, when acceleration or angular acceleration is generated by the polymer element 10 itself, for example, receiving bending stress or being in linear motion or rotational motion, since force which is caused thereby is applied to the polymer element 10, the polymer element 10 is deformed (curved) (FIG. 4B).

For example, as shown in FIG. 4B, in a case where the polymer element 10 is deformed in a positive direction on the Z axis (the electrode layer 12B side), the electrode layer 12B side is compressed and the electrode layer 12A side is extended in the polymer layer 11. Then, since the cations move to the electrode layer 12A side where the internal pressure is low in a state where the cations are solvated with a polar solvent, the cations are in a sparse state on the electrode layer 12B side while being in a dense state on the electrode layer 12A side. Accordingly, in this case, a voltage V where a potential is higher on the electrode layer 12A side than on the electrode layer 12B side is generated in the polymer element 10. In other words, in this case, as shown with the arrow "−V" in the brackets in FIG. 4B, a negative polarity voltage (−V) is detected in the voltage function section 9 (in this case, a voltmeter) which is connected with the electrode layers 12A and 12B.

In a case where the polymer element 10 is deformed in a negative direction on the Z axis (the electrode layer 12A side), in contrast, the electrode layer 12A side is compressed and the electrode layer 12B side is extended in the polymer layer 11. Then, since the cations move to the electrode layer 12B side where the internal pressure is low in a state of being solvated with a polar solvent, the cations are in a sparse state on the electrode layer 12A side while being in a dense state on the electrode layer 12B side. Accordingly, in this case, a voltage V where a potential is higher on the electrode layer 12B side than on the electrode layer 12A side is generated in the polymer element 10. In other words, in this case, a positive polarity voltage (+V) is detected in the voltage function section 9 (a voltmeter) which is connected with the electrode layers 12A and 12B.

Next, description will be given of a case of using an ionic liquid which includes cations in a liquid form as an ionic substance.

Also in this case, firstly, when the polymer element 10 itself is not in linear motion or rotational motion and acceleration and angular acceleration are not generated, the polymer element 10 has a planar form without being deformed (curved) (FIG. 4A). Therefore, since the ionic liquid is substantially uniformly dispersed in the polymer layer 11, a potential difference is not generated between the electrode layers 12A and 12B and the detected voltage in the polymer element 10 is 0 (zero) V.

On the other hand, when acceleration or angular acceleration is generated by the polymer element 10 itself, for example, being in linear motion or rotational motion, since force which is caused thereby is applied to the polymer element 10, the polymer element 10 is deformed (curved) (FIG. 4B).

For example, as shown in FIG. 4B, in a case where the polymer element 10 is deformed in a positive direction on the Z axis (the electrode layer 12B side), the electrode layer 12B side is compressed and the electrode layer 12A side is extended in the polymer layer 11. Then, in a case where the polymer layer 11 is a cation-exchange film, the cations in the ionic liquid move in the film and move to the electrode layer 12A side where the internal pressure is low. On the other hand, the anions do not move due to being interrupted by a functional group of the polymer layer 11. Accordingly, in this case, a voltage V where a potential is higher on the electrode layer 12A side than on the electrode layer 12B side is generated in the polymer element 10. In other words, in this case, as shown with the arrow "−V" in the brackets in FIG. 4B, a negative polarity voltage (−V) is detected in the voltage function section 9 (in this case, a voltmeter) which is connected with the electrode layers 12A and 12B.

In a case where the polymer element 10 is deformed in a negative direction on the Z axis (the electrode layer 12A side), in contrast, the electrode layer 12A side is compressed and the electrode layer 12B side is extended in the polymer layer 11. Then, for the same reason described above, the cations in the ionic liquid move to the electrode layer 12B side where the internal pressure is low. Accordingly, in this case, a voltage V where a potential is higher on the electrode layer 12B side than on the electrode layer 12A side is generated in the polymer element 10. In other words, in this case, a positive polarity voltage (+V) is detected in the voltage function section 9 (a voltmeter) which is connected with the electrode layers 12A and 12B.

C. Operation when Functioning as an Electric Double Layer Capacitor

In addition, the polymer element 10 of the present embodiment also functions as an electric double layer capacitor. When a predetermined voltage is applied between the electrode layers 12A and 12B, the ionic substance which is impregnated in the polymer layer 11 moves and is arranged on the surface of the electrode layers 12A and 12B. Due to this, an electric double layer is formed and an electrical charge is stored in this portion and as a result, the electric double layer functions as an electric double layer capacitor.

D. Operation of the Porous Carbon Material 121 Included in the Electrode Layers 12A and 12B Here, description will be given of an operation of the porous carbon material 121 which is included in the electrode layers 12A and 12B of the polymer element 10 of the present embodiment.

Figure 5:
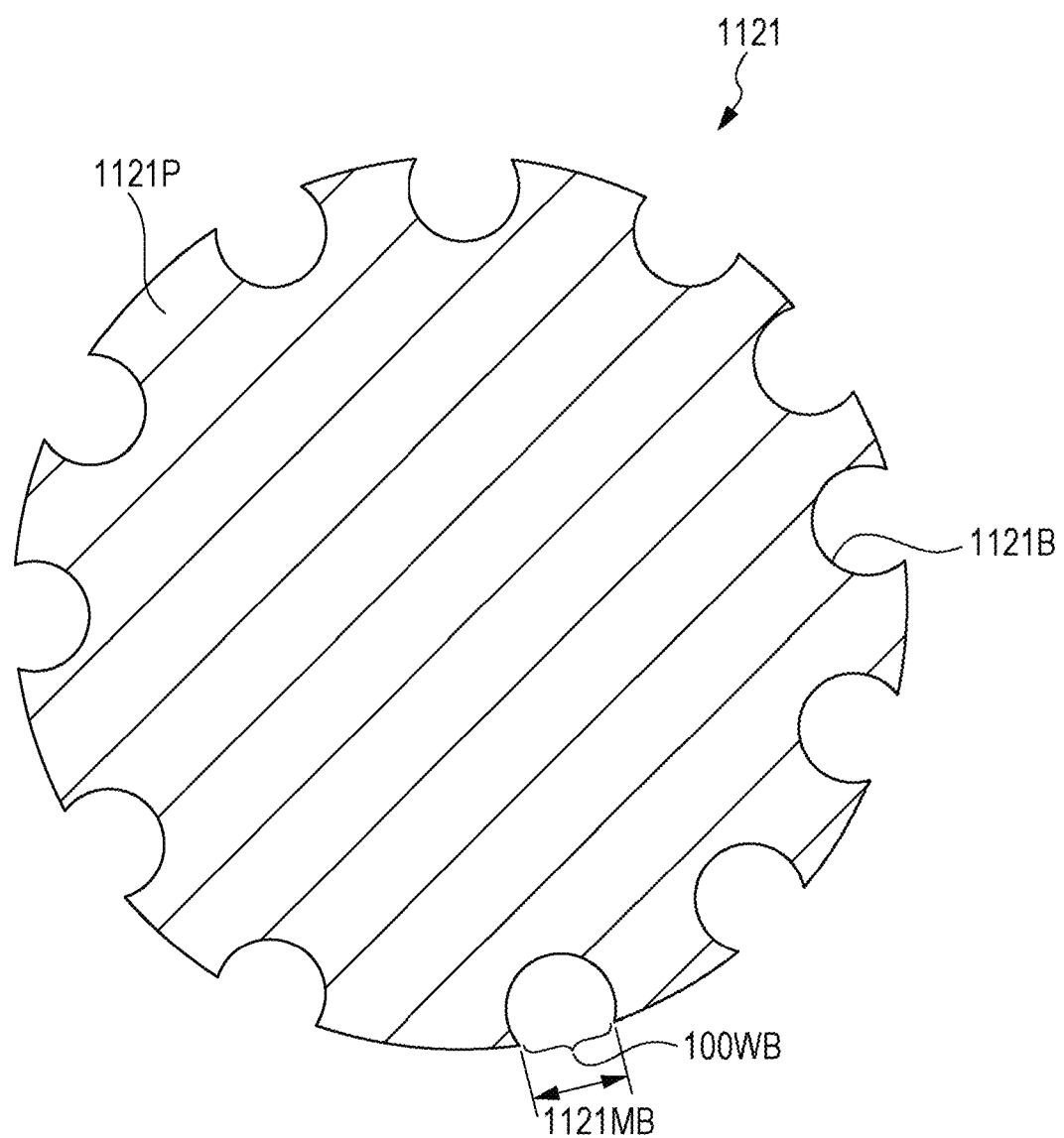
FIG. 5 is a cross-sectional schematic diagram which represents a configuration of a porous carbon material according to a comparative example.

FIG. 5 schematically represents a cross-sectional configuration of a porous carbon material 1121 according to the comparative example. In the porous carbon material 1121, a plurality of mesopores 1121B are provided in the surfaces of particles 1121P. Ions are adsorbed to the mesopores 1121B without passing macropores. The number of the adsorbed ions is increased by increasing the number of the mesopores 1121B. Accordingly, the displacement amount of a polymer element where the porous carbon material 1121 is used in an electrode layer is large. However, in the porous carbon material 1121, since a width 100WB of openings 1121MB on surfaces of the particles 1121P is narrow, ions do not easily enter the mesopores 1121B. Accordingly, the movement of the ions is a rate-determination step and the displacement amount of the polymer element per unit of time is small.

Figure 6:
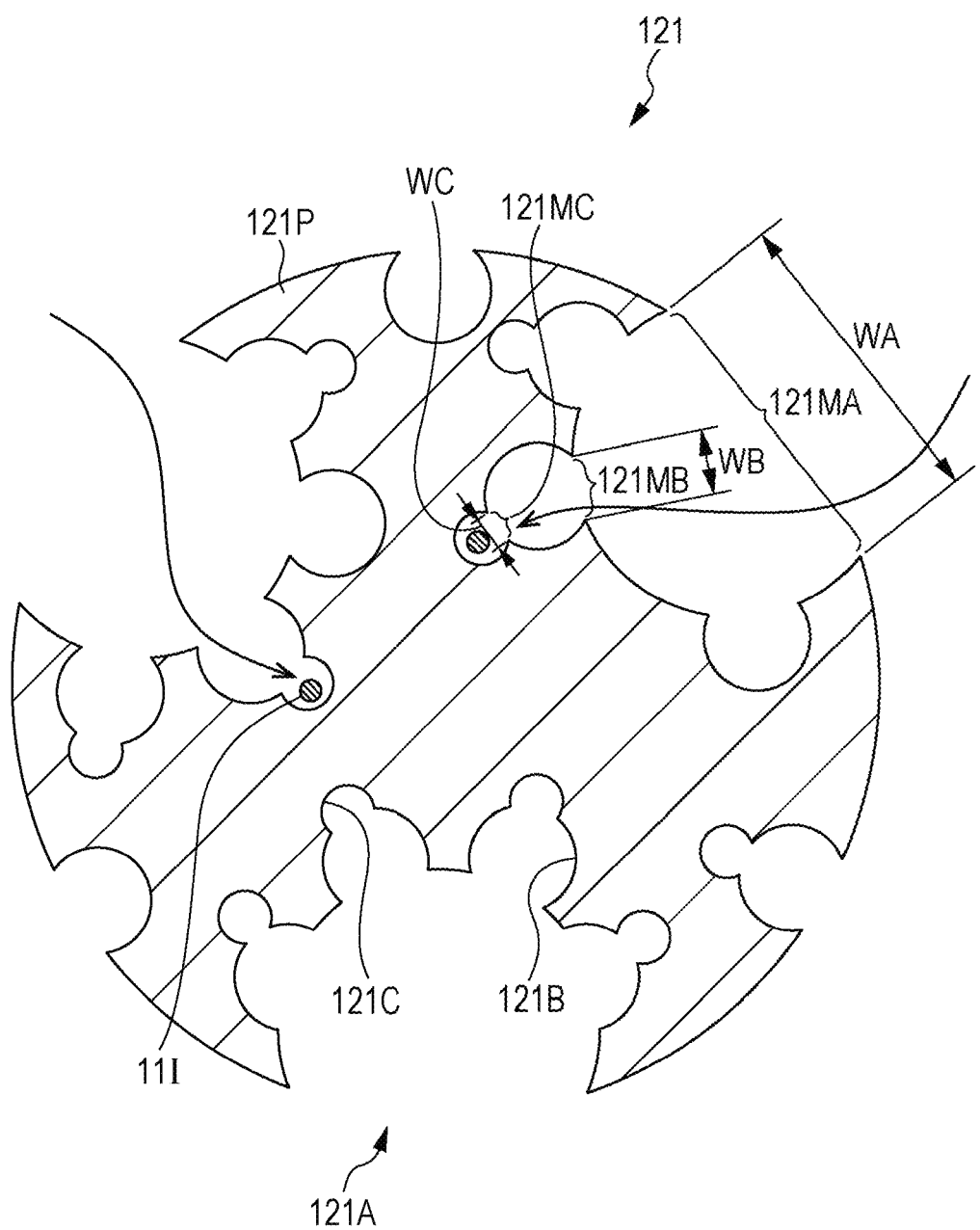
FIG. 6 is a cross-sectional schematic diagram which represents a state where ions move in the porous carbon material shown in FIG. 2.

In contrast to this, in the polymer element 10, the porous carbon material 121 of the electrode layers 12A and 12B has a hierarchical type porous structure. For this reason, as shown in FIG. 6, the ions 11I (cations or anions) firstly enter the macropores 121A from the large openings 121MA, and then move to the mesopores 121B by passing through the openings 121MB, and move to the micropores 121C from the mesopores 121B through the openings 121MC in sequence. The ions 11I easily enter the large openings 121MA and the ions 11I which entered the macropores 121A efficiently reach the micropores 121C via the mesopores 121B. Accordingly, in the electrode layers 12A and 12B which include the porous carbon material 121, a large number of the ions 11I are adsorbed to the micropores 121C without the movement thereof being interrupted. Thus, the displacement amount per unit of time is large.

Figure 7:
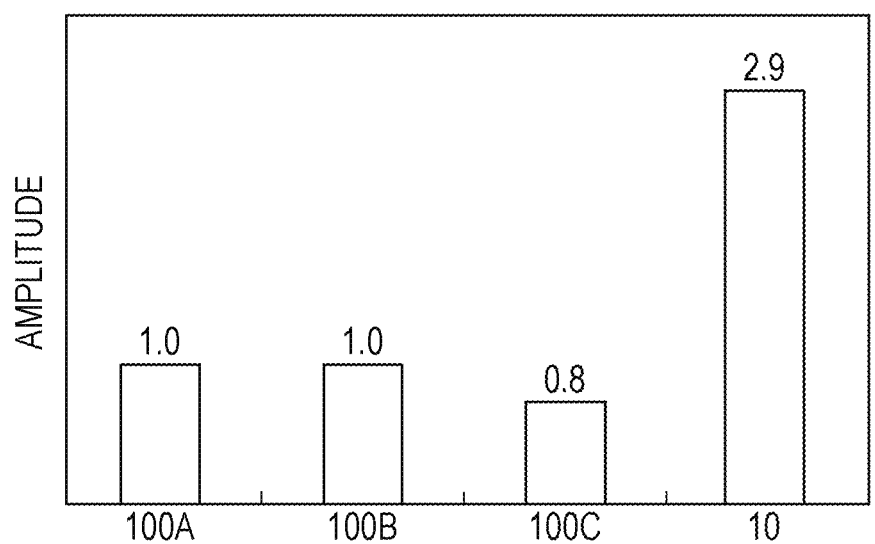
FIG. 7 is a diagram which represents an amplitude of the polymer element shown in FIG. 1.

FIG. 7 represents an amplitude of the polymer element 10 in addition to an amplitude of the polymer elements 100A, 100B, and 100C which include the porous carbon material 1121 in an electrode layer (FIG. 5). Ketjenblack (a registered trademark) was used for the porous carbon material 1121 of the polymer element 100A and mesoporous carbons, which are different types from each other, were used for the porous carbon material 1121 of the polymer elements 100B and 100C. When the amplitude of the polymer element 100A was set to 1, while the amplitude of the polymer elements 100B and 100C was substantially the same, the amplitude of the polymer element 10 was 2.9 times as much. In this manner, by the ions 11I easily moving, it was confirmed that the displacement amount per unit of time increased and the amplitude was increased.

As described above, in the present embodiment, since the electrode layers 12A and 12B include the porous carbon material 121 which has a hierarchical type porous structure, it is possible to improve the moving speed of the ions 11I. Thus, it is possible to improve the characteristics of the polymer element 10 such as amplitude and generated force.

Description will be given below of modified examples of the embodiments described above and other embodiments; however, the same reference numerals are used for the same constituent elements as in the embodiments described above and overlapping description thereof will be appropriately omitted.

Modified Examples

Figure 8:
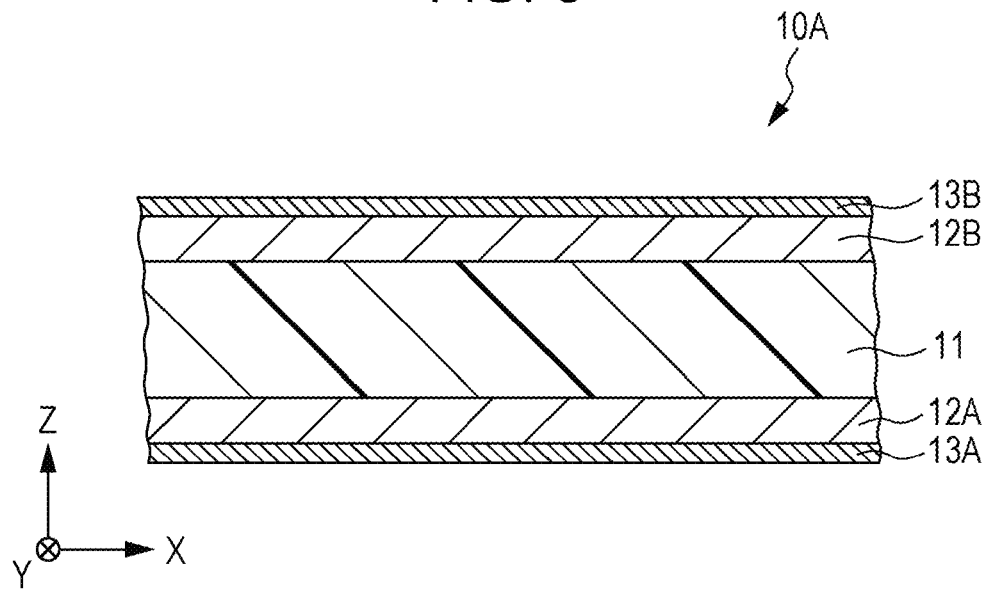
FIG. 8 is a cross-sectional diagram which represents a configuration of a polymer element according to a modified example.

FIG. 8 represents a cross-sectional configuration of a polymer element (a polymer element 10A) according to the modified example. The polymer element 10A has each of a low resistance layer 13A on an opposite surface of the polymer layer 11 of the electrode layer 12A and a low resistance layer 13B on an opposite surface of the polymer layer 11 of the electrode layer 12B. The low resistance layers 13A and 13B are configured by a material which has a lower electrical resistance than the constituent material of the electrode layers 12A and 12B. Apart from this point, the polymer element 10A has the same configuration as the polymer element 10 of the first embodiment described above and the operation and effects thereof are also the same.

The polymer element 10A has the low resistance layer 13A, the electrode layer 12A, the polymer layer 11, the electrode layer 12B, and the low resistance layer 13B in this order. By laminating the low resistance layers 13A and 13B on the electrode layers 12A and 12B in this manner, an increase in the electrical resistance of the electrode layers 12A and 12B is suppressed and higher-level characteristics are obtained. Examples of the constituent material of the low resistance layers 13A and 13B include a metal material, a conductive carbon material, a conductive polymer material, and the like. Examples of the metal material include gold (Au), silver (Ag), platinum (Pt), aluminum (Al), nickel (Ni), and the like. Examples of the conductive carbon material include carbon nanotubes, carbon nanowires, carbon fibers, graphene, Ketjenblack (a registered trademark), carbon black, and the like. Examples of the conductive polymer material include polyaniline, polyacetylene, polythiophene, polypyrrole, and the like. Examples of the metal oxide include an indium oxide-based compound, a zinc oxide-based compound, and the like. The indium oxide-based compound is, for example, an indium tin oxide (ITO) or the like and the zinc oxide-based compound is, for example, indium zinc oxide (IZO), aluminum-doped zinc oxide (AZO), gallium-doped zinc oxide (GZO), or the like. The thickness of the low resistance layers 13A and 13B is arbitrary; however, it is preferable that the thickness does not influence the displacement of the polymer element 10A. The thickness of the low resistance layers 13A and 13B which are configured by a metal material is, for example, 50 nm or less. It is preferable that the low resistance layers 13A and 13B are continuous films such that the potentials of the electrode layers 12A and 12B are uniform. Examples of a method for forming such low resistance layers 13A and 13B include a plating method, a vapor deposition method, a sputtering method, and the like. The low resistance layers 13A and 13B may be film-formed on a substrate in advance and may be transferred from the substrate to the electrode layers 12A and 12B.

Second Embodiment

Figure 9:
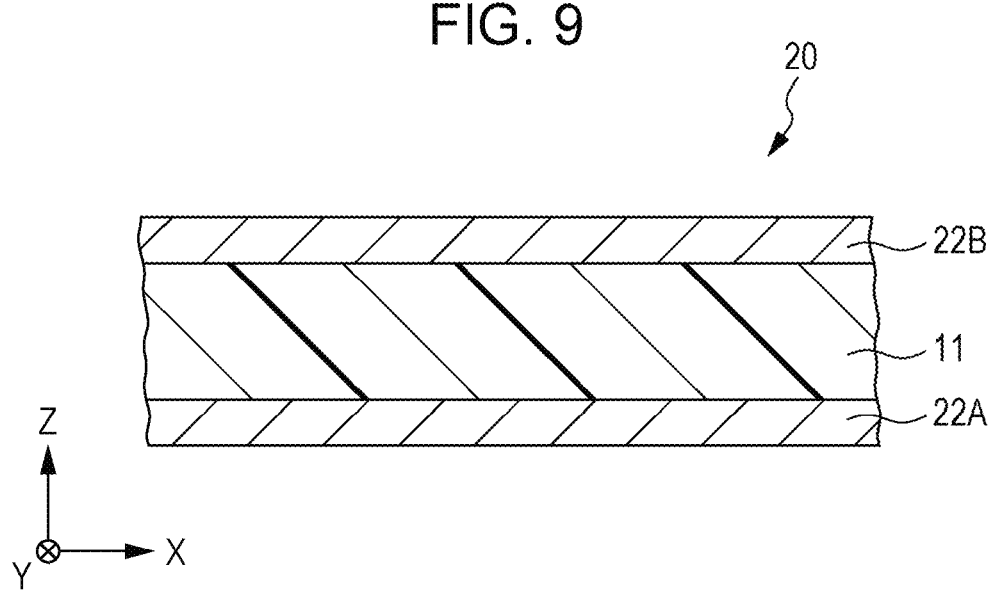
FIG. 9 is a cross-sectional diagram which represents a configuration of a polymer element according to a second embodiment of the present disclosure.

FIG. 9 represents a cross-sectional configuration of a polymer element (a polymer element 20) according to the second embodiment of the present disclosure. The electrode layers (electrode layers 22A and 22B) of the polymer element 20 include a metal oxide in addition to the porous carbon material which has a hierarchical type porous structure (the porous carbon material 121 in FIG. 2) in a polymer material. Apart from this point, the polymer element 20 has the same configuration as the polymer element 10 of the embodiment described above and the operation and effects thereof are also the same.

The metal oxide which is included in the electrode layers 22A and 22B may be a metal oxide where oxidation-reduction is possible; however, an oxide of a transition metal is preferable. For example, it is preferable that ruthenium oxide, iridium oxide, manganese oxide, titanium oxide, tantalum oxide, or the like is included in the electrode layers 22A and 22B. From among the above, it is preferable that ruthenium oxide, iridium oxide, or manganese oxide is included in the electrode layers 22A and 22B. The metal oxide which is included in the electrode layers 22A and 22B may be an oxide of a metal other than a transition metal and may be, for example, zinc oxide. The electrode layers 22A and 22B may include a hydrated metal oxide. Apart from a polymer material, a metal oxide is included in the electrode layers 22A and 22B, for example, at a 5% to 30% weight ratio (metal oxide/a metal oxide+porous carbon material).

Figure 10:
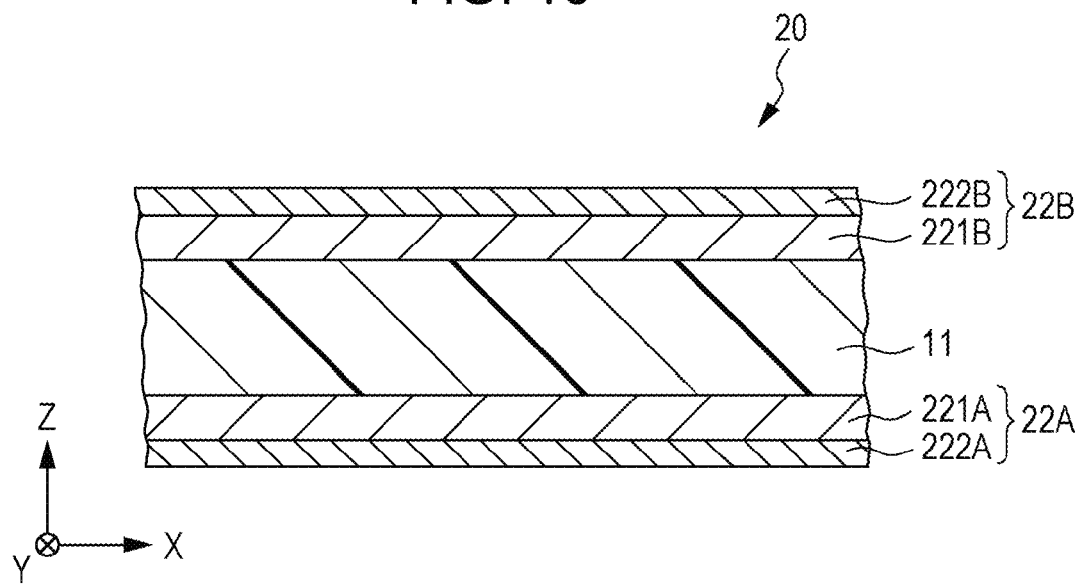
FIG. 10 is a cross-sectional diagram which represents another example of the polymer element shown in FIG. 9.
Figure 11:
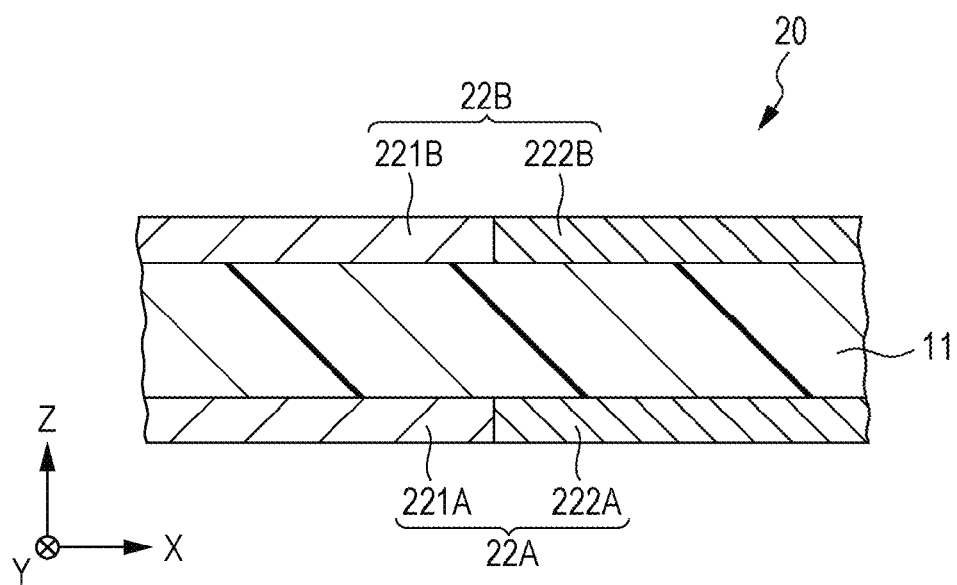
FIG. 11 is a cross-sectional diagram which represents another example of the polymer element shown in FIG. 9.

As shown in FIG. 10 and FIG. 11, carbon layers 221A and 221B which include a porous carbon material and metal oxide layers 222A and 222B which include a metal oxide may be separately provided. The carbon layers 221A and 221B and the metal oxide layers 222A and 222B may be overlapped in a laminating direction (a Z direction) of the polymer layer 11 and the electrode layers 22A and 22B (FIG. 10) and may be lined up in the in-plane (XY plane) direction of the electrode layers 22A and 22B (FIG. 11).

In the polymer element 20 which includes a metal oxide (or the metal oxide layers 222A and 222B) in the electrode layers 22A and 22B, the ions which are generated by oxidation-reduction reaction of the metal oxide (second cations 22P and second anions 22M in FIG. 13 which will be described below) are chemically adsorbed in the vicinity of an interface inside the electrode layers 22A and 22B and the capacity of the polymer element 20 increases. Description Will be Given Below Thereof.

Figure 12:
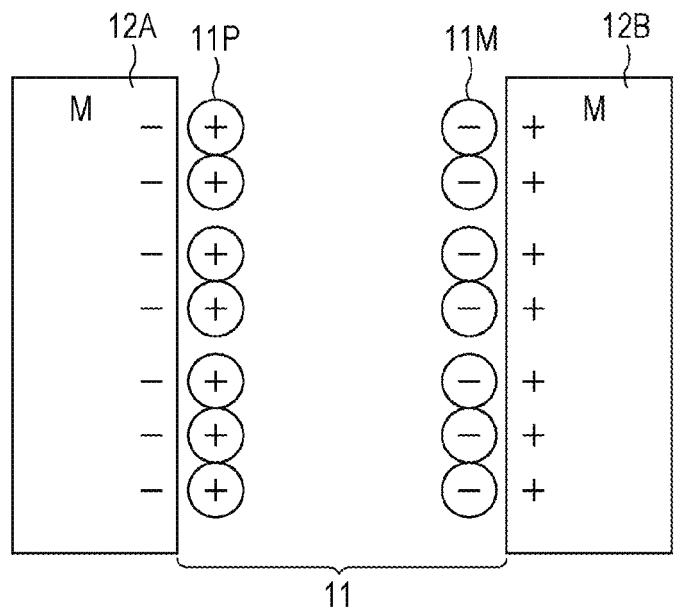
FIG. 12 is a cross-sectional diagram which represents a state of an electrode layer interface of the polymer element shown in FIG. 1.

FIG. 12 schematically represents a state of the interface between the electrode layers 12A and 12B of the polymer element 10. For example, when a predetermined driving voltage is applied between the electrode layers 12A and 12B such that the electrode layer 12A is a negative potential and the electrode layer 12B is a positive potential, the cations (first cations 11P) of the polymer layer 11 move to the electrode layer 12A side and the anions (first anions 11M) move to the electrode layer 12B side. By the first cations 11P and the first anions 11M being physically adsorbed to the macropores 121C of the porous carbon material 121 (FIG. 2) of the electrode layers 12A and 12B, the polymer element 10 is operated. That is, in the polymer element 10, an operation is carried out by an electric double layer being formed in the interface between the electrode layers 12A and 12B. Accordingly, by increasing the amount of the porous carbon materials 121 which are included in the electrode layers 12A and 12B, the capacity of the polymer element 10 increases and it is possible to improve the displacement amount.

However, when the amount of the porous carbon material 121 is increased, there is a concern that the humidity dependency will be large and the characteristics of the polymer element 10 will be deteriorated. In addition, the adhesion between the electrode layers 12A and 12B and the polymer layer 11 decreases, cracks are easily generated, and peeling or the like is easily generated in the electrode layers 12A and 12B. Furthermore, the electrical resistance of the electrode layers 12A and 12B is increased. For this reason, in the polymer element 10, it is difficult to increase the capacity thereof.

In contrast to this, in the polymer element 20, since the electrode layers 22A and 22B include a metal oxide, the metal oxide generates ions (M$^-$H$^+$) by the oxidation-reduction reaction shown by the following reaction formula (1) or reaction formula (2). Here, M in the reaction formulas (1) and (2) represents a metal oxide.

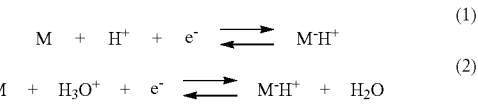

$$M + H^+ + e^- \rightleftarrows M^-H^+ \quad (1)$$
$$M + H_3O^+ + e^- \rightleftarrows M^-H^+ + H_2O \quad (2)$$

Figure 13:
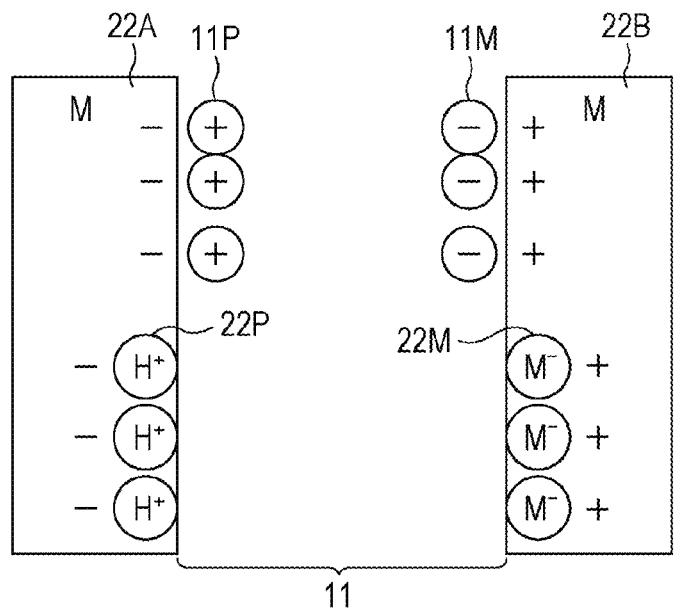

As shown in FIG. 13, in the polymer element 20, cations (second cations 22P) and anions (second anions 22M) which are generated by the oxidation-reduction reaction of the metal oxide are chemically adsorbed in the vicinity of the interface inside the electrode layers 22A and 22B. That is, in the polymer element 20, in addition to the same electric double layer as the polymer element 10 described above, a pseudo-double layer derived from a metal oxide is formed. Due to this, it is possible to increase the capacity of the polymer element 20 compared to the polymer element 10.

Figure 14:
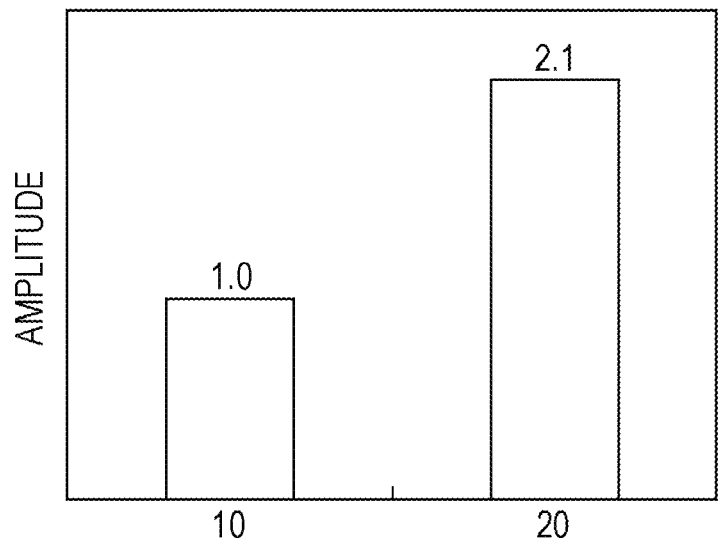
FIG. 14 is a diagram which represents an amplitude of the polymer element shown in FIG. 9.

FIG. 14 represents an amplitude of the polymer element 20 using the polymer element 10 as a reference. In the polymer element 20, the amplitude is improved to 2.1 times that of the polymer element 10. Due to this, it is possible to confirm that the capacity is increased in the polymer element 20 and the displacement amount of the polymer element 20 is further improved.

Figure 15:
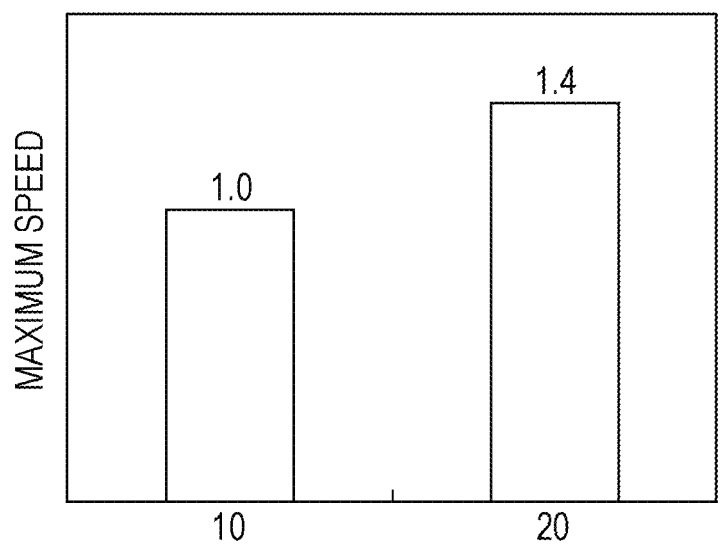
FIG. 15 is a diagram which represents maximum speeds of the polymer element shown in FIG. 9.

FIG. 15 represents a maximum speed of the polymer element 20 using the polymer element 10 as a reference. In the polymer element 20, the maximum speed is improved to 1.4 times that of the polymer element 10. In this manner, it is also possible to improve the characteristics such as the maximum speed in the polymer element 20.

As described above, in the polymer element 20, since the electrode layers 22A and 22B include a metal oxide in addition to the porous carbon material 121 (FIG. 2) which has a hierarchical type porous structure, both the ion moving speed and the capacity improve. Thus, in the polymer element 20, it is possible to further improve the characteristics such as the amplitude, the maximum speed, and the generated force compared to the polymer element 10.

In addition, since it is not necessary to increase the amount of the porous carbon material 121 in the polymer element 20, it is possible to maintain the humidity dependency. In addition, it is possible to easily form the electrode layers 22A and 22B while suppressing the generation of cracks, peeling, and the like. Furthermore, it is also possible to suppress an increase in the electrical resistance of the electrode layers 22A and 22B.

Third Embodiment

Figure 16:
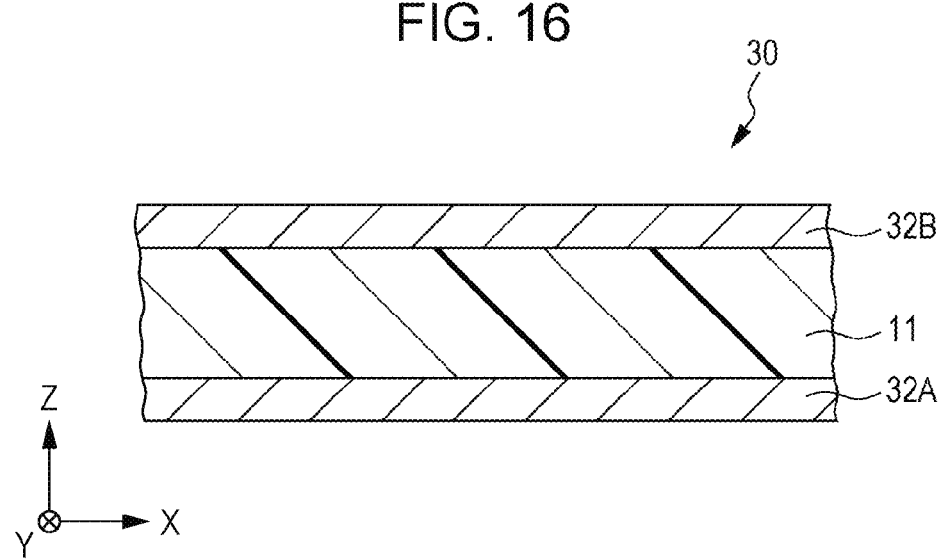
FIG. 16 is a cross-sectional diagram which represents a configuration of a polymer element according to a third embodiment of the present disclosure.

FIG. 16 represents a cross-sectional configuration of a polymer element (a polymer element 30) according to the third embodiment of the present disclosure. Electrode layers (electrode layers 32A and 32B) of the polymer element 30 include a porous carbon material and a metal oxide in a polymer material. In the electrode layers 32A and 32B, the porous carbon material is not limited to a porous carbon material which has a hierarchical type porous structure.

Apart from this point, the polymer element 30 has the same configuration as the polymer element 20 of the embodiment described above and the operation and effects thereof are also the same.

The same metal oxide as the metal oxide described in the electrode layers 22A and 22B described above is included in the electrode layers 32A and 32B. In addition to bio-carbon, an artificial porous carbon, and the like which have a hierarchical type porous structure, Ketjenblack (a registered trademark), mesoporous carbon, triporous carbon, carbon black, activated carbon, activated carbon cross, carbon fiber, carbon nanotubes, and the like may be used for the porous carbon material of the electrode layers 32A and 32B.

In the polymer element 30, in the same manner as described in the polymer element 20 described above, since ions which are generated by an oxidation-reduction reaction of a metal oxide form a pseudo-double layer, the capacity increases.

In addition, in the polymer element 30, since the electrode layers 32A and 32B include a porous carbon material in addition to a metal oxide, the durability thereof improves compared to a case of configuring the electrode layers by only the metal oxide.

Figure 17:
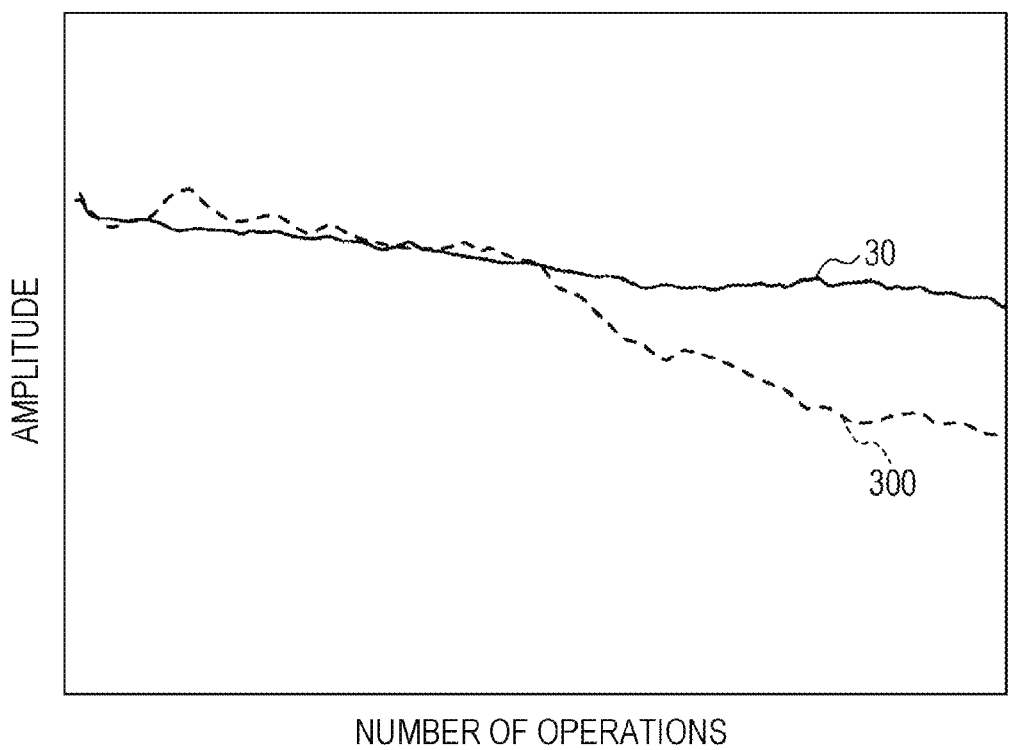
FIG. 17 is a diagram which represents durability of the polymer element shown in FIG. 16.

FIG. 17 compares and represents the durability of a polymer element 300 where an electrode layer is configured by only a metal oxide and the durability of the polymer element 30. In the durability testing, a relationship between the number of operations and the amplitude is examined when repeatedly operating the polymer elements 30 and 300. While the amplitude decreases as the number of operations increases in the polymer element 300, the same amplitude is maintained even when the number of operations increases in the polymer element 30. In this manner, it is possible to confirm that the polymer element 30 has a higher durability than the polymer element 300.

Furthermore, by a porous carbon material being included in the electrode layers 32A and 32B, a decrease in the ion movement speed is suppressed.

Application Examples

Subsequently, description will be given of application examples (application examples for the imaging apparatus; Application Examples 1 and 2) of the polymer element according to the embodiments and the modified examples described above.

Application Example 1

Configuration of Mobile Phone 8

Figure 18:
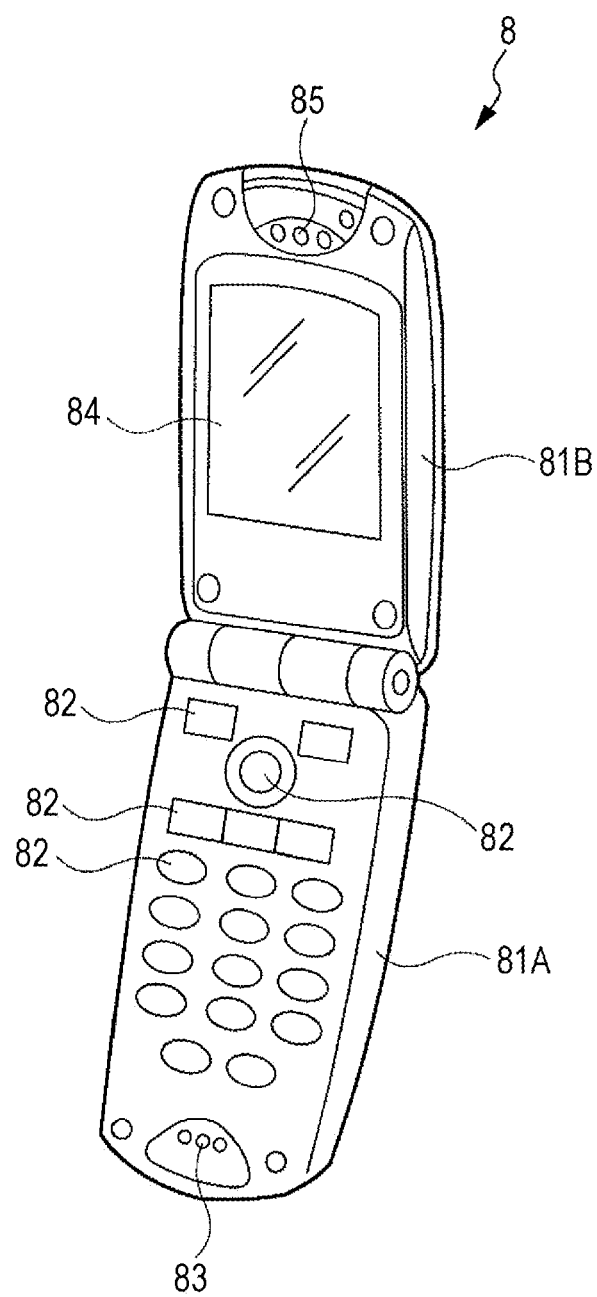
FIG. 18 is a perspective diagram which represents a configuration example of an electronic device to which the polymer element shown in FIG. 1 and the like is applied.
Figure 19:
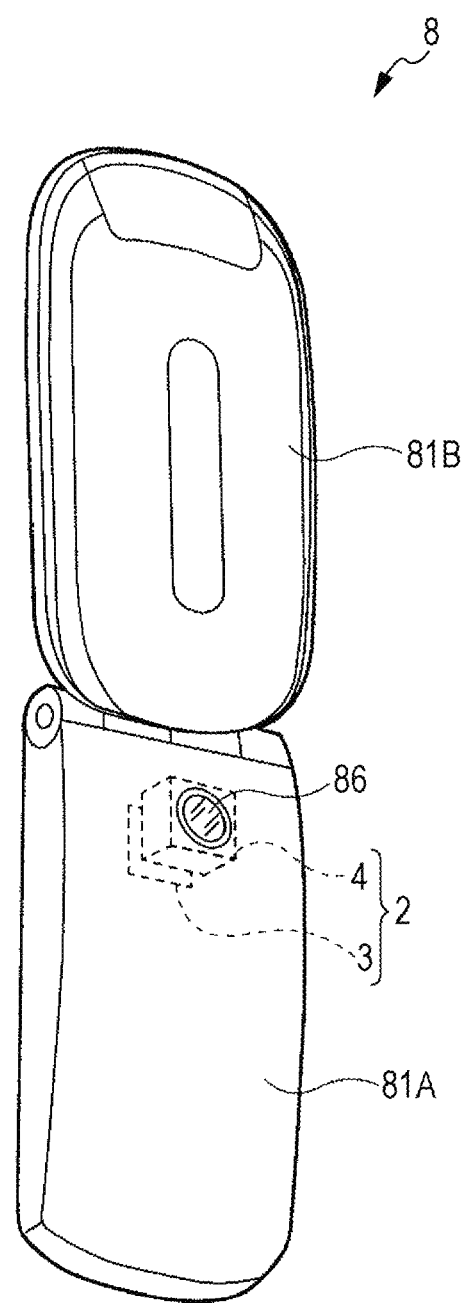
FIG. 19 is a perspective diagram which represents the electronic device shown in FIG. 18 from a different direction.

FIG. 18 and FIG. 19 represent a schematic configuration of a mobile phone with an imaging function (a mobile phone 8) as an example of an electronic device which is provided with an imaging apparatus according to Application Example 1 of the polymer element of the embodiments and the like described above, with a perspective diagram. In the mobile phone 8, two casings 81A and 81B are linked via a hinge mechanism, which is not shown in the diagram, to be able to be freely folded.

As shown in FIG. 18, a plurality of various types of operating keys 82 are installed on a surface of one side of the casing 81A and a microphone 83 is installed in the bottom end section thereof. The operating keys 82 are for receiving the predetermined operations by a user and inputting information. The microphone 83 is for inputting the voice of the user during telephone calls and the like.

As shown in FIG. 18, a display section 84 using a liquid crystal display panel or the like is installed on a surface of one side of the casing 81B and a speaker 85 is installed in the top end section thereof. Various types of information such as the reception state of radio waves, a residual amount of a battery, the telephone number of the other person on the phone, contents which are registered as a telephone book (telephone numbers, names, and the like of other people), outgoing call history, and incoming call history are displayed on the display section 84. The speaker 85 is for outputting the voice or the like of the other person on the phone during telephone calls or the like.

As shown in FIG. 19, a cover glass 86 is installed on a surface of the other side of the casing 81A and an imaging apparatus 2 is provided in a position which corresponds to the cover glass 86 inside the casing 81A. The imaging apparatus 2 is configured by a camera module 4 which is arranged on an object side (the cover glass 86 side) and an imaging element 3 which is arranged on an image side (the inner section side of the casing 81A). The imaging element 3 is an element which acquires an imaging signal which is imaged by a lens (a lens 40 which will be described below) inside the camera module 4. The imaging element 3 is formed of an image sensor where, for example, a charge coupled device (CCD) or a complementary metal oxide semiconductor (CMOS) is mounted.

Configuration of Imaging Apparatus 2

Figure 20:
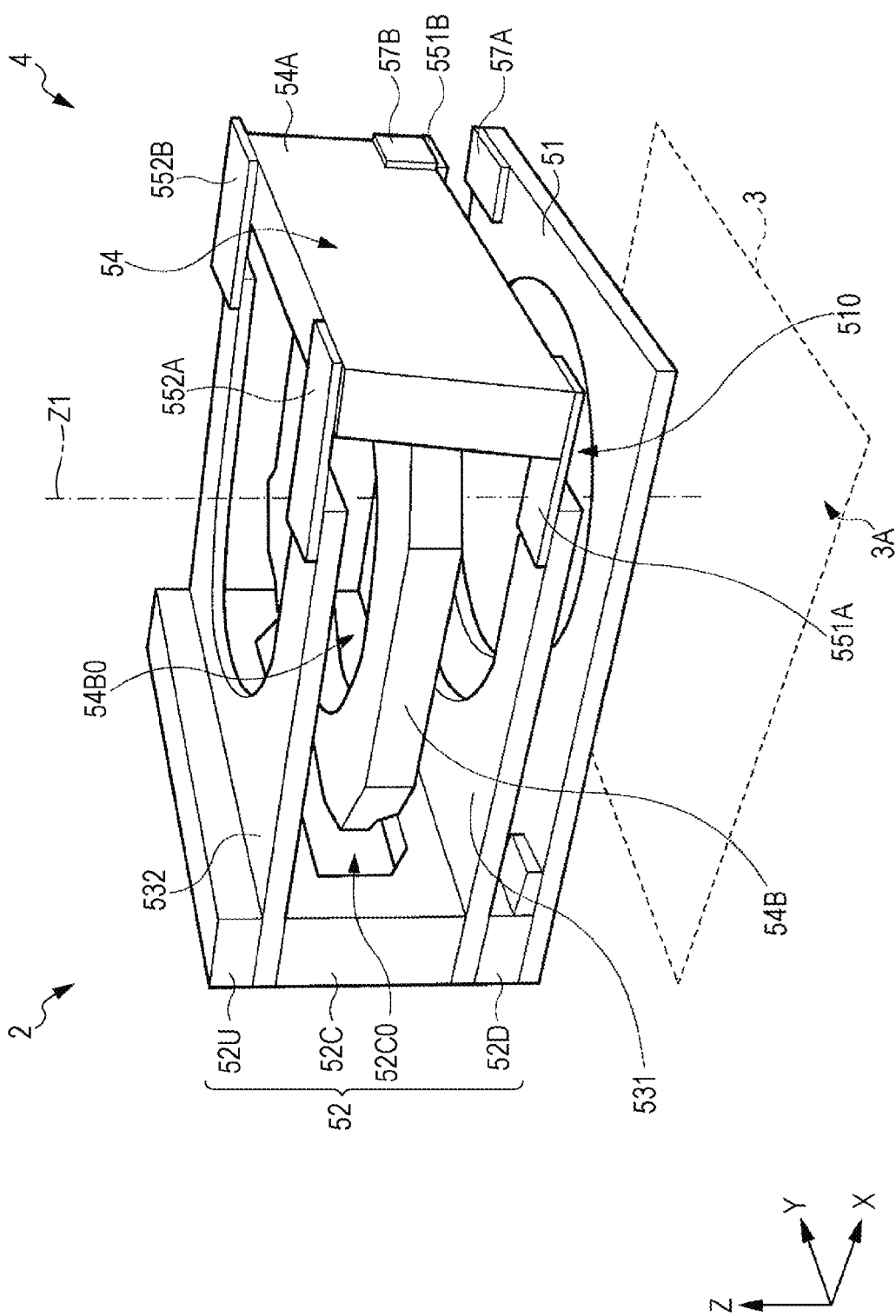
FIG. 20 is a perspective diagram which represents a main configuration of an imaging apparatus shown in FIG. 19.
Figure 21:
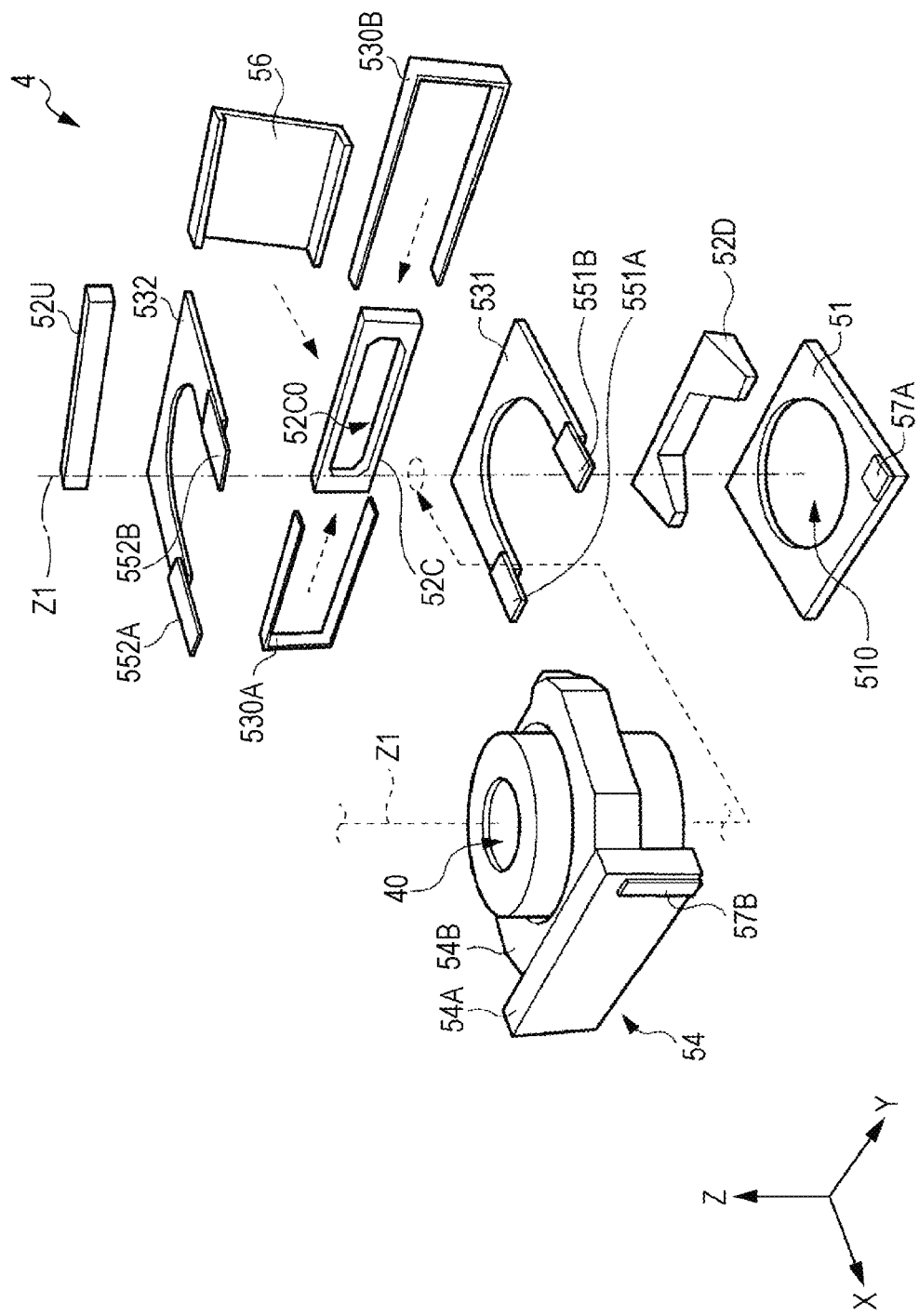
FIG. 21 is an exploded perspective diagram which represents a camera module shown in FIG. 20.

FIG. 20 represents a schematic configuration example of the imaging apparatus 2 with a perspective diagram and FIG. 21 represents a configuration of the camera module 4 in the imaging apparatus 2 with an exploded perspective diagram.

The camera module 4 is provided with a support member 51, a polymer actuator element 531, a lens holding member 54, the lens 40, and a polymer actuator element 532 in order (along the positive direction on the Z axis) from the image side (the imaging surface 3A side of the imaging element 3) to the object side along an optical axis Z1. The polymer actuator elements 531 and 532 are configured by the polymer elements 10, 10A, 20, and 30 described above. Here, the lens 40 is omitted in FIG. 20. The camera module 4 is also provided with a fixing member 52, linking members 551A, 551B, 552A, and 552B, fixed electrodes 530A and 530B, a pressing member 56, and hole elements 57A and 57B. Here, the members of the camera module 4 other than the lens 40 correspond to one specific example of a "driving apparatus which drives a lens" (a lens driving apparatus) in the present disclosure.

The support member 51 is a base member (a base body) for supporting the entire camera module 4.

The fixing member 52 is a member for fixing respective ends of the polymer actuator elements 531 and 532. The fixing member 52 is formed of three members of a lower section fixing member 52D, a center (middle section) fixing member 52C, and an upper section fixing member 52U which are arranged from the image side (the lower side in FIG. 20 and FIG. 21) to the object side (the upper side). One end of the polymer actuator element 531 and one end of the fixed electrodes 530A and 530B are respectively arranged to be interposed between the lower section fixing member 52D and the center fixing member 52C. On the other hand, one end of the polymer actuator element 532 and the other ends of the fixed electrodes 530A and 530B are respectively arranged to be interposed between the center fixing member 52C and the upper section fixing member 52U. In addition, an opening 52C0 for partially interposing a part of the lens holding member 54 (a part of a holding section 54B which will be described below) is formed in the center fixing member 52C out of the above. Due to this, since the part of the lens holding member 54 is able to move inside the opening 52C0, it is possible to effectively use the space and it is possible to miniaturize the camera module 4.

The fixed electrodes 530A and 530B are electrodes for supplying a driving voltage Vd (FIG. 22A and FIG. 22B which will be described below) from a voltage supplying section 59 which will be described below with respect to the electrode layers in the polymer actuator elements 531 and 532 (the electrode layers 12A, 12B, 22A, and 22B described above). Each of the fixed electrodes 530A and 530B is formed of, for example, gold (AU) or a metal and the like which is plated with gold and has a U shape. Due to this, each of the fixed electrodes 530A and 530B interposes the top and bottom of the center fixing member 52C (both side surfaces along the Z axis) and it is possible to apply the same voltage in parallel with a small amount of wiring with respect to a pair of the polymer actuator elements 531 and 532. In addition, in a case of configuring the fixed electrodes 530A and 530B of a metal material which is plated with gold, it is possible to prevent a deterioration in contact resistance due to oxidation of the surface or the like.

The lens holding member 54 is a member for holding the lens 40 and is formed of, for example, a hard resin material such as a liquid crystal polymer. The lens holding member 54 is arranged such that the center is on the optical axis Z1 and is formed of a cyclic holding section 54B which holds the lens 40 and a connecting section 54A which supports the holding section 54B and connects the holding section 54B with linking members 551A, 551B, 552A and 552B which will be described below. In addition, the holding section 54B is arranged between driving surfaces which will be described below in the pair of the polymer actuator elements 531 and 532.

Each of the polymer actuator elements 531 and 532 has a driving surface (a driving surface on the X-Y plane) which is orthogonal with the optical axis Z1 of the lens 40 and is arranged such that the driving surfaces oppose each other along the optical axis Z1. Each of the polymer actuator elements 531 and 532 is for driving the lens holding member 54 (and the lens 40) along the optical axis Z1 via the linking members 551A, 551B, 552A, and 552B which will be described below.

Each of the linking members 551A, 551B, 552A, and 552B is a member for linking (connecting) each of the other ends of the polymer actuator elements 531 and 532 and an end section of the connecting section 54A with each other. In detail, each of the linking members 551A and 551B links between the bottom end section of the connecting section 54A and the other end of the polymer actuator element 531 and each of the linking members 552A and 552B links between the top end section of the connecting section 54A and the other end of the polymer actuator element 532. It is desirable that each of the linking members 551A, 551B, 552A, and 552B is formed of, for example, a flexible film such as a polyimide film and formed of a soft material which has rigidity (bending rigidity) which is equal or less (preferably, the same or less) to that of each of the polymer actuator elements 531 and 532. Due to this, there is a degree of freedom for the linking members 551A, 551B, 552A, and 552B to curve in an opposite direction to the curving direction of the polymer actuator elements 531 and 532. Accordingly, a cross-sectional shape in a cantilever formed of the polymer actuator elements 531 and 532 and the linking members 551A, 551B, 552A, and 552B draws a curved line in an S letter shape. As a result, the connecting section 54A is able to move in parallel along the Z axis direction and the holding section 54B (and the lens 40) is driven in the Z axis direction while maintaining a state of being in parallel with respect to the support member 51. Here, it is possible to use, for example, a spring constant as the rigidity (bending rigidity) described above.

Operation of Camera Module 4

Figure 22A:
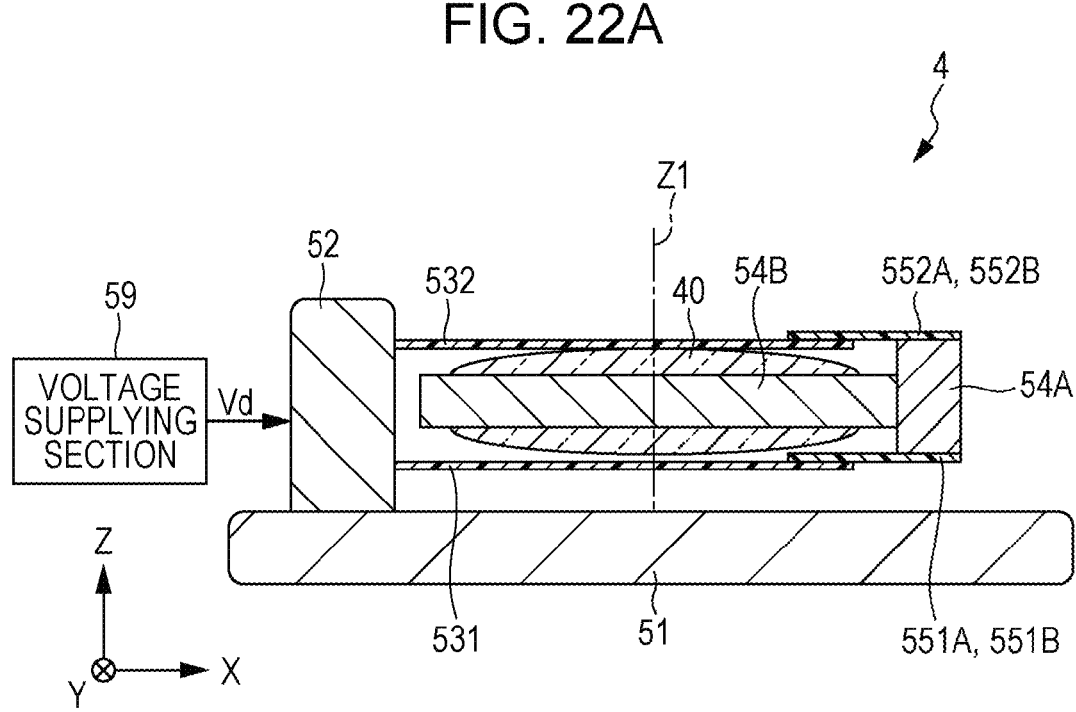
FIG. 22A is a side surface schematic diagram which represents a state before an operation of the camera module shown in FIG. 20.
Figure 22B:
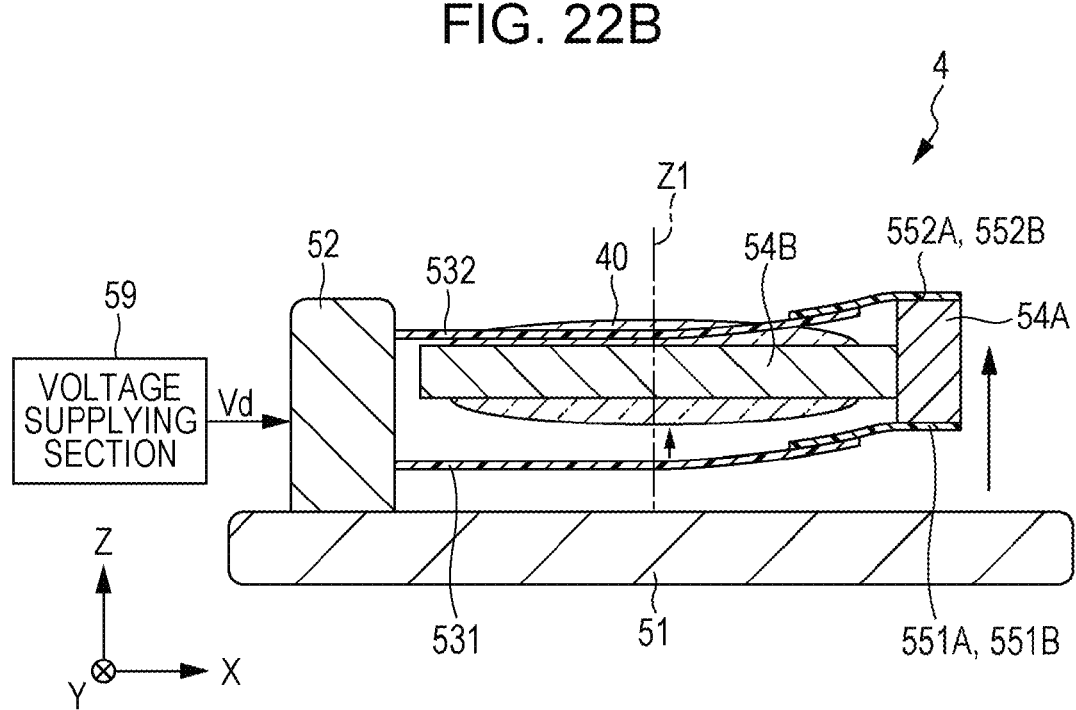
FIG. 22B is a cross-sectional schematic diagram which represents a state after the operation of the camera module shown in FIG. 22A.

Each of FIGS. 22A and 22B schematically represents a schematic configuration example of the camera module 4 with a side surface diagram (a Z-X side surface diagram) and FIG. 22A shows a state before an operation and FIG. 22B shows a state after the operation.

In the camera module 4, when the driving voltage Vd is supplied from the voltage supplying section 59 with respect to the polymer actuator elements 531 and 532, each of the other end sides of the polymer actuator elements 531 and 532 is curved along the Z axis direction under the principle described above. Due to this, the lens holding member 54 is driven by the polymer actuator elements 531 and 532 and the lens 40 is able to move along the optical axis Z1 (refer to the arrow in FIG. 22B). In this manner, in the camera module 4, the lens 40 is driven along the optical axis Z1 by a driving apparatus (a lens driving apparatus) using the polymer actuator elements 531 and 532. In other words, the lens 40 inside the camera module 4 moves along the optical axis Z1 and focusing or zooming is performed.

Application Example 2

Subsequently, description will be given of an imaging apparatus (a camera module) according to Application Example 2 of the polymer element of the embodiments and the like described above. The imaging apparatus according to the present application example is also incorporated into the mobile phone 8 with an imaging function, for example, as shown in FIG. 18 and FIG. 19 described above. However, while the polymer element (the polymer actuator element) is used as a lens driving apparatus in the imaging apparatus 2 of Application Example 1, the polymer element is used as a driving apparatus for driving the imaging element 3 in the imaging apparatus of the present application example as will be described below.

Configuration of Imaging Apparatus 2A

Figure 23:
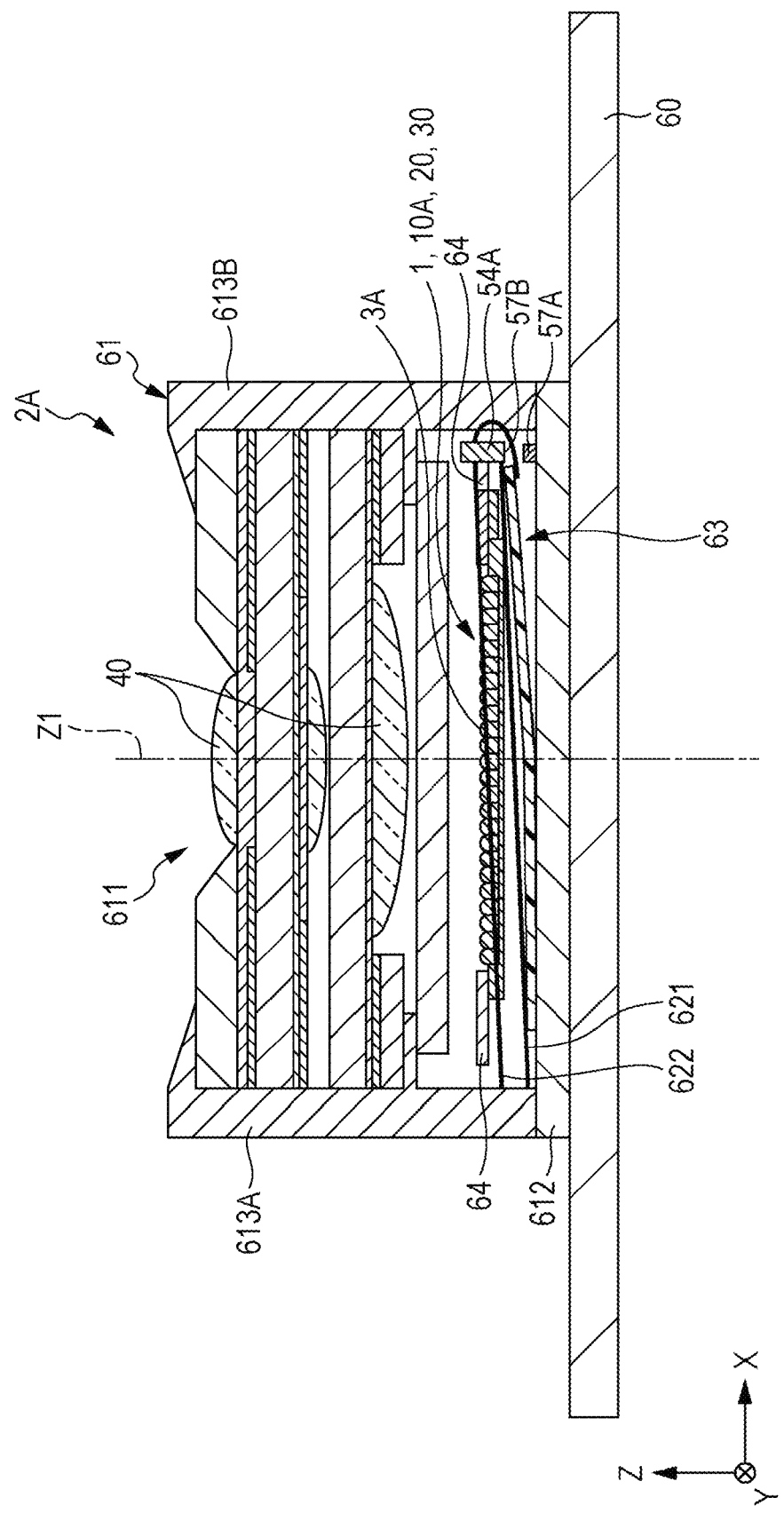
FIG. 23 is a cross-sectional diagram which represents another example of the imaging apparatus shown in FIG. 19.

FIG. 23 represents a schematic configuration example of an imaging apparatus (an imaging apparatus 2A) according to the present application example with a side surface diagram (a Z-X side surface diagram). The imaging apparatus 2A is provided with a housing 61 for holding various types of members on a substrate 60.

An opening section 611 for arranging the lens 40 is formed and a pair of a side wall sections 613A and 613B and a bottom section 612 which is positioned on the substrate 60 are provided in the housing 61. One end side of a pair of plate springs 621 and 622 is fixed in the side wall section 613A and the imaging element 3 is arranged on the other end side of the plate springs 621 and 622 via the connecting section 54A and the support section 64. In addition, one end side of the polymer actuator element 63 is fixed on the bottom section 612 and the other end side of the polymer actuator element 63 is fixed on the bottom surface of the support section 64. Here, the hole element 57A is also arranged on the bottom section 612 and the hole element 57B is arranged in a position opposing the hole element 57A on the connecting section 54A.

Here, out of the members of the imaging apparatus 2A, the bottom section 612, the side wall section 613A, the plate springs 621 and 622, the polymer actuator element 63, the support section 64, and the connecting section 54A mainly correspond to one specific example of a "driving apparatus which drives an imaging element" (an imaging element driving apparatus) in the present disclosure.

The polymer actuator element 63 is for driving the imaging element 3 as described above and is configured using the polymer elements 10, 10A, 20, and 30 according to the embodiments described above.

Operation of Imaging Apparatus 2A

Figure 24A:
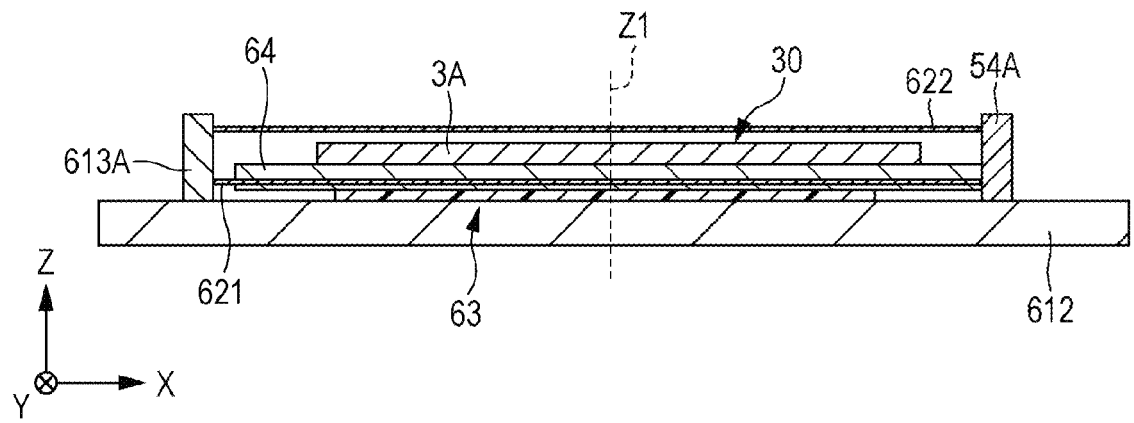
FIG. 24A is a side surface schematic diagram which represents a state before an operation of the imaging apparatus shown in FIG. 23.
Figure 24B:
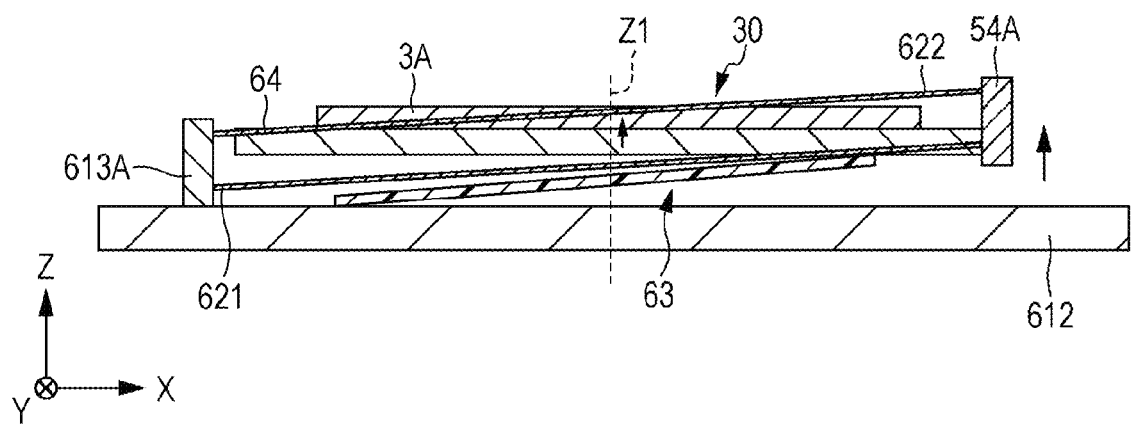
FIG. 24B is a cross-sectional schematic diagram which represents a state after the operation of the imaging apparatus shown in FIG. 24A.

Each of FIG. 24A and FIG. 24B schematically represents a part of the imaging apparatus 2A (the imaging element driving apparatus described above) with a side surface diagram (a Z-X side surface diagram) and FIG. 24A shows a state before an operation and FIG. 24B shows a state after the operation.

In the imaging apparatus 2A, when a driving voltage Vd is supplied from a voltage supplying section (which is not shown in the diagram) with respect to the polymer actuator element 63, each of the other end sides of the polymer actuator element 63 are curved along the Z axis direction under the principle described above. Due to this, the connecting section 54A is driven by the polymer actuator elements 63 and the imaging element 3 is able to move along the optical axis Z1 of the lens 40 (refer to the arrow in FIG. 24B). In this manner, in the imaging apparatus 2A, the imaging element 3 is driven along the optical axis Z1 of the lens 40 by a driving apparatus (an imaging element driving apparatus) using the polymer actuator elements 63. Due to this, focusing or zooming is performed by changing the relative distance between the lens 40 and the imaging element 3.

Other Application Examples

Figure 25A:
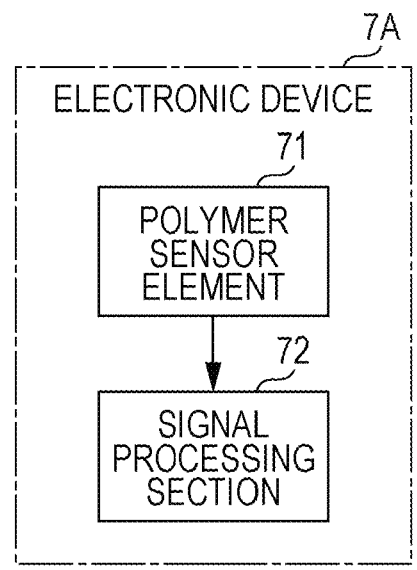
FIG. 25A is a schematic diagram which represents an example of a configuration of an electronic device to which the polymer element shown in FIG. 1 and the like is applied.
Figure 25B:
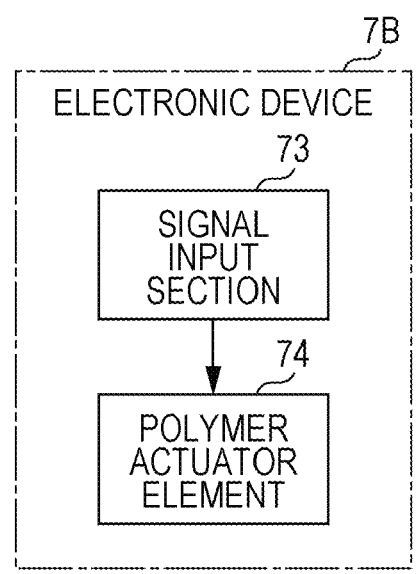
FIG. 25B is a schematic diagram which represents another example of the electronic device shown in FIG. 25A.

FIG. 25A and FIG. 25B schematically represent a configuration example of electronic devices (electronic devices 7A and 7B) according to other application examples.

The electronic device 7A (FIG. 25A) includes a polymer sensor element 71 and a signal processing section 72. In the electronic device 7A, a signal which is detected by the polymer sensor element 71 being deformed is input to the signal processing section 72 and various types of signal processing are performed. Examples of the electronic device 7A include a pulse sensor which detects expansion and shrinkage of blood vessels, a tactile sensor which detects a contact position of a finger or the like and the strength of the contact, a bending sensor which detects a bending state which accompanies page turning of a book and the like, a motion sensor which detects movements in human joints, and the like.

The electronic device 7B (FIG. 25B) includes a signal input section 73 and a polymer actuator element 74. In the electronic device 7B, the polymer actuator element 74 is deformed according to a signal from the signal input section 73. Examples of the electronic device 7B include a catheter and the like.

Other Modified Example

Description was given above of techniques of the present disclosure using the embodiments, the modified examples, and the application examples; however, the present disclosure is not limited to the embodiments and the like and various types of modifications are possible. For example, the shapes, materials, or the like in other members in the polymer elements and the imaging apparatus are not limited to the description in the embodiments and the like described above and additionally, the laminated structure of the polymer element is not limited to the description in the embodiments and the like described above and appropriate changes are possible.

Furthermore, description was given of a case where the electrode layers 22A, 22B, 32A, and 32B include a metal oxide in the second embodiment and the third embodiment described above; however, the electrode layers 22A, 22B, 32A, and 32B may include a conductive polymer material instead of the metal oxide. Examples of the conductive polymer material include polyaniline, polyacetylene, polythiophene, polypyrrole, and the like. The electrode layers 22A, 22B, 32A, and 32B may include the conductive polymer material in addition to the metal oxide.

In addition, description was given of a case of laminating the low resistance layers 13A and 13B in the electrode layers 12A and 12B in the modified example described above (FIG. 8); however, the low resistance layers 13A and 13B may be laminated in the electrode layers 22A and 22B (FIG. 9) or the electrode layers 32A and 32B (FIG. 16).

Furthermore, description was given of an example of a case of applying the polymer actuator element or the polymer sensor element to the electronic device in the application examples described above; however, a polymer element which functions as an electric double layer capacitor and a polymer element which functions as a secondary battery may be applied to the electronic device.

Moreover, in the embodiments and the like described above, description was mainly given using the lens driving apparatus which drives a lens which is a driving object along the optical axis as an example of the driving apparatus of the present disclosure; however, without being limited to this case, for example, the lens driving apparatus may drive the lens in a direction which is orthogonal to the optical axis. In addition, it is also possible to apply the driving apparatus of the present disclosure to a driving apparatus or the like which drives other driving objects such as aperture (refer to Japanese Unexamined Patent Application Publication No. 2008-259381 and the like) or camera shake correction, in addition to such a lens driving apparatus or an imaging element driving apparatus. Furthermore, it is possible to apply the driving apparatus, the camera module, and the imaging apparatus of the present disclosure to various types of electronic devices in addition to the mobile phone described in the embodiments described above.

Here, the effects described in the present specification are merely illustrative and are not limited, and there may be other effects.

Here, the present disclosure is also able to adopt the following configurations.

(1) A polymer element including a pair of electrode layers of which at least one includes a porous carbon material, and a polymer layer between the pair of electrode layers, in which the porous carbon material is provided with a first hole in a surface and a second hole which is smaller than the first hole and which communicates with the first hole.

(2) The polymer element according to (1), in which the porous carbon material is further provided with a third hole which is smaller than the second hole and which communicates with the second hole.

(3) The polymer element according to (2), in which the first hole and the second hole are in contact, and the second hole and the third hole are in contact.

(4) The polymer element according to (2) or (3), in which a diameter of the first hole is larger than 50 nm, a diameter of the second hole is 2 nm to 50 nm, and a diameter of the third hole is smaller than 2 nm.

(5) The polymer element according to any one of (1) to (4), in which a surface of the porous carbon material is provided with a first opening into the first hole and the first hole is provided with a second opening into the second hole, and the first opening is larger than the second opening.

(6) The polymer element according to any one of (1) to (5), in which a metal oxide is included in the electrode layer including the porous carbon material.

(7) The polymer element according to (6), in which the metal oxide is a transition metal oxide.

(8) The polymer element according to (6) or (7), in which at least any one of ruthenium oxide, iridium oxide, and manganese oxide is included as the metal oxide.

(9) The polymer element according to any one of (1) to (8), in which the porous carbon material is derived from plants.

(10) The polymer element according to any one of (1) to (9), in which a low resistance layer is provided on a surface of the pair of electrode layers opposite to the polymer layer.

(11) The polymer element according to any one of (1) to (10), in which the pair of electrode layers include a polymer material.

(12) The polymer element according to any one of (1) to (11), which is configured as a polymer actuator element.

(13) The polymer element according to any one of (1) to (12), which is configured as a polymer sensor element.

(14) A polymer element including a pair of electrode layers, and a polymer layer between the pair of electrode layers, in which at least one of the pair of electrode layers includes a porous carbon material, and a metal oxide.

(15) An electronic device including a polymer element which has a pair of electrode layers of which at least one includes a porous carbon material, and a polymer layer between the pair of electrode layers, in which the porous carbon material is provided with a first hole in a surface and a second hole which is smaller than the first hole and which communicates with the first hole.

(16) An electronic device including a polymer element which has a pair of electrode layers and a polymer layer between the pair of electrode layers, in which at least one of the pair of electrode layers includes a porous carbon material, and a metal oxide.

(17) A camera module including a lens, and a driving apparatus which is configured using a polymer element and which drives the lens, in which the polymer element has a pair of electrode layers of which at least one includes a porous carbon material, and a polymer layer between the pair of electrode layers, and the porous carbon material is provided with a first hole in a surface and a second hole which is smaller than the first hole and which communicates with the first hole.

(18) A camera module including a lens, and a driving apparatus which is configured using a polymer element and which drives the lens, in which the polymer element has a pair of electrode layers, and a polymer layer between the pair of electrode layers, and at least one of the pair of electrode layers includes a porous carbon material, and a metal oxide.

(19) An imaging apparatus including a lens, an imaging element which acquires an imaging signal imaged by the lens, and a driving apparatus which is configured using a polymer element and which drives the lens or the imaging element, in which the polymer element has a pair of electrode layers of which at least one includes a porous carbon material, and a polymer layer between the pair of electrode layers, and the porous carbon material is provided with a first hole in a surface and a second hole which is smaller than the first hole and which communicates with the first hole.

(20) An imaging apparatus including a lens, an imaging element which obtains an imaging signal imaged by the lens, and a driving apparatus which is configured using a polymer element and which drives the lens or the imaging element, in which the polymer element has a pair of electrode layers, and a polymer layer between the pair of electrode layers, and at least one of the pair of electrode layers includes a porous carbon material, and a metal oxide.

It should be understood by those skilled in the art that various modifications, combinations, sub-combinations and alterations may occur depending on design requirements and other factors insofar as they are within the scope of the appended claims or the equivalents thereof.

What is claimed is:

1. A polymer element comprising:
a pair of electrode layers of which at least one includes a porous carbon material; and
a polymer layer between the pair of electrode layers,
wherein the porous carbon material is provided with a first hole in a surface and a second hole which is smaller than the first hole and which communicates with the first hole.

2. The polymer element according to claim 1,
wherein the porous carbon material is further provided with a third hole which is smaller than the second hole and which communicates with the second hole.

3. The polymer element according to claim 2,
wherein the first hole and the second hole are in contact, and the second hole and the third hole are in contact.

4. The polymer element according to claim 2,
wherein a diameter of the first hole is larger than 50 nm, a diameter of the second hole is 2 nm to 50 nm, and a diameter of the third hole is smaller than 2 nm.

5. The polymer element according to claim 1,
wherein a surface of the porous carbon material is provided with a first opening into the first hole and the first hole is provided with a second opening into the second hole, and
the first opening is larger than the second opening.

6. The polymer element according to claim 1,
wherein a metal oxide is included in the electrode layer including the porous carbon material.

7. The polymer element according to claim 6,
wherein the metal oxide is a transition metal oxide.

8. The polymer element according to claim 6,
wherein at least any one of ruthenium oxide, iridium oxide, and manganese oxide is included as the metal oxide.

9. The polymer element according to claim 1,
wherein the porous carbon material is derived from plants.

10. The polymer element according to claim 1,
wherein a low resistance layer is provided on a surface of the pair of electrode layers opposite to the polymer layer.

11. The polymer element according to claim 1,
wherein the pair of electrode layers include a polymer material.

12. The polymer element according to claim 1, which is configured as a polymer actuator element.

13. The polymer element according to claim 1, which is configured as a polymer sensor element.

14. An electronic device comprising:
a polymer element which has a pair of electrode layers of which at least one includes a porous carbon material, and a polymer layer between the pair of electrode layers,
wherein the porous carbon material is provided with a first hole in a surface and a second hole which is smaller than the first hole and which communicates with the first hole.

15. A camera module comprising:
a lens; and
a driving apparatus which is configured using a polymer element and which drives the lens,
wherein the polymer element has
a pair of electrode layers of which at least one includes a porous carbon material, and
a polymer layer between the pair of electrode layers, and
the porous carbon material is provided with a first hole in a surface and a second hole which is smaller than the first hole and which communicates with the first hole.

16. An imaging apparatus comprising:
a lens;
an imaging element which acquires an imaging signal imaged by the lens; and
a driving apparatus which is configured using a polymer element and which drives the lens or the imaging element,
wherein the polymer element has
a pair of electrode layers of which at least one includes a porous carbon material, and
a polymer layer between the pair of electrode layers, and
the porous carbon material is provided with a first hole in a surface and a second hole which is smaller than the first hole and which communicates with the first hole.

* * * * *